US012812731B2

(12) United States Patent
Fujishiro et al.

(10) Patent No.: US 12,812,731 B2
(45) Date of Patent: Nov. 24, 2026

(54) COMMUNICATION METHOD, NETWORK APPARATUS, AND USER EQUIPMENT

(71) Applicant: KYOCERA Corporation, Kyoto (JP)

(72) Inventors: Masato Fujishiro, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 337 days.

(21) Appl. No.: 18/431,538

(22) Filed: Feb. 2, 2024

(65) Prior Publication Data

US 2024/0179797 A1 May 30, 2024

Related U.S. Application Data

(63) Continuation of application No. PCT/JP2022/029549, filed on Aug. 1, 2022.

(60) Provisional application No. 63/228,257, filed on Aug. 2, 2021.

(51) Int. Cl.

*H04W 76/40* (2018.01)
*H04W 68/02* (2009.01)
*H04W 76/27* (2018.01)

(52) U.S. Cl.

CPC ........... *H04W 76/40* (2018.02); *H04W 68/02* (2013.01); *H04W 76/27* (2018.02)

(58) Field of Classification Search

CPC ..... H04W 76/40; H04W 68/02; H04W 76/27; H04W 4/08; H04W 68/00; H04W 76/15
See application file for complete search history.

(56) References Cited

U.S. PATENT DOCUMENTS

2019/0182632 A1* 6/2019 Fujishiro ............... H04W 48/16
2021/0298092 A1 9/2021 Geng et al.
2022/0015063 A1* 1/2022 Byun .................... H04W 76/40

FOREIGN PATENT DOCUMENTS

WO WO-2018084195 A1 * 5/2018 ............ H04W 72/30
WO 2020/119615 A1 6/2020
WO 2021/149939 A1 7/2021
WO WO-2021229346 A1 * 11/2021 ............. H04L 67/14

OTHER PUBLICATIONS

CMCC; "Discussion on SA2 LS on 5MBS"; 3GPP TSG RAN WG2 #113b-e; R2-2103728; Electronic Meeting; Apr. 12-20, 2021; total 7 pages.
Huawei, HiSilicon; "NG-RAN 5MBS Capability awareness"; 3GPP TSG-SA WG2 Meeting #145E; S2-2104394; Elbonia; May 17-28, 2021; total 12 pages.
Qualcomm Inc.; "NR Multicast group paging aspects"; 3GPP TSG-RAN WG2 Meeting #114e; R2-2105018; E-meeting; May 19-28, 2021; pp. 1-7.

(Continued)

*Primary Examiner* — Cheikh T Ndiaye
(74) *Attorney, Agent, or Firm* — Studebaker Brackett PLLC

(57) ABSTRACT

In a first aspect, a communication method is performed by a user equipment in a mobile communication system. The communication method includes receiving a paging message including a TMGI from a base station when the user equipment is in an RRC inactive state, and starting a procedure of transitioning from the RRC inactive state to an RRC connected state when the user equipment is participating in an MBS session indicated by the TMGI.

8 Claims, 14 Drawing Sheets

(56) References Cited

OTHER PUBLICATIONS

3rd Generation Partnership Project; Technical Specification Group Services and System Aspects; Architectural enhancements for 5G multicast-broadcast services; Stage 2 (Release 17); 3GPP TS 23.247 V1.0.0; Jun. 2021; pp. 1-8.

* cited by examiner

| | Delivery mode 1 | Delivery mode 2 |
|---|---|---|
| Intended for | Multicast sessions<br>(High QoS requirement) | Broadcast sessions<br>(Low QoS requirement) |
| Reception in | Connected | Connected<br>IDLE/INACTIVE |
| Configuration signalling by | RRC Reconfiguration | BCCH<br>MCCH |

FIG. 8

```
Paging ::=                          SEQUENCE {
   pagingRecordList                     PagingRecordList
        OPTIONAL, -- Need N
   lateNonCriticalExtension             OCTET STRING
        OPTIONAL,
   nonCriticalExtension                 SEQUENCE{}
        OPTIONAL
}

PagingRecordList ::=                SEQUENCE (SIZE(1..maxNrofPageRec)) OF PagingRecord

PagingRecord ::=                    SEQUENCE {
   ue-Identity                          PagingUE-Identity,
   accessType                           ENUMERATED {non3GPP}
        OPTIONAL,   -- Need N
   ...
   MBS-group-notification               MBS-session-ID
}
```

FIG. 17

```
Paging ::=                          SEQUENCE {
   pagingRecordList                     PagingRecordList
        OPTIONAL, -- Need N
   lateNonCriticalExtension             OCTET STRING
        OPTIONAL,
   nonCriticalExtension                 Paging-v17-IEs
        OPTIONAL
}

Paging-v17-IEs ::=                  SEQUENCE {
   mbsGroupRecordList                   MBS-Group-Notification-RecordList
            OPTIONAL, -- Need N
   nonCriticalExtension                 SEQUENCE{}
        OPTIONAL
}

MBS-Group-Notification-RecordList        ::=                SEQUENCE
     (SIZE(1..maxNrofGroRec)) OF GroupRecord

GroupRecord ::=                     SEQUENCE {
   MBS-session-ID                       MBS-session-ID,
   ...
}
```

FIG. 18

COMMUNICATION METHOD, NETWORK APPARATUS, AND USER EQUIPMENT

RELATED APPLICATIONS

The present application is a continuation based on PCT Application No. PCT/JP2022/029549, filed on Aug. 1, 2022, which claims the benefit of U.S. Provisional Patent Application No. 63/228,257 filed on Aug. 2, 2021. The content of which is incorporated by reference herein in their entirety.

TECHNICAL FIELD

The present disclosure relates to a communication method, a network apparatus, and a user equipment used in a mobile communication system.

BACKGROUND OF INVENTION

In the 3rd Generation Partnership Project (3GPP) standards, the technical specifications of New Radio (NR), which is a 5th generation (5G) radio access technology, are stipulated. The NR has features such as high speed, large capacity, high reliability, and low latency compared to Long Term Evolution (LTE), which is a 4th generation (4G) radio access technology. In the 3GPP, there is an ongoing discussion for developing technical specifications of a multicast broadcast service (MBS) in the 5G system (for example, see Non-Patent Document 1).

CITATION LIST

Non-Patent Literature

Non-Patent Document 1: 3GPP Contribution: RP-201038 "WID revision: NR Multicast and Broadcast Services"

SUMMARY

In a first aspect, a communication method is performed by a user equipment in a mobile communication system. The communication method includes receiving a paging message including a TMGI from a base station when the user equipment is in an RRC inactive state, and starting a procedure of transitioning from the RRC inactive state to an RRC connected state when the user equipment is participating in an MBS session indicated by the TMGI.

In a second aspect, a user equipment is used in a mobile communication system. The user equipment includes a receiver receiving a paging message including a TMGI from a base station when the user equipment is in an RRC inactive state, and a controller starting a procedure of transitioning from the RRC inactive state to an RRC connected state when the user equipment is participating in an MBS session indicated by the TMGI.

In a third aspect, a communication method is used in a mobile communication system. The communication method includes: receiving, by a first network apparatus included in a network of the mobile communication system, a message from a second network apparatus included in the network, the message including multicast broadcast service (MBS) capability information regarding whether the second network apparatus supports an MBS function; generating, by the first network apparatus, a first paging message used for notifying start of an MBS session based on the MBS capability information; and transmitting, by the first network apparatus, the first paging message to the second network apparatus.

In a fourth aspect, a network apparatus is included in a network of a mobile communication system. The network apparatus includes: a receiver receiving, from another network apparatus included in the network, a message including multicast broadcast service (MBS) capability information regarding whether the other network apparatus supports an MBS function; a controller generating a first paging message used for notifying start of an MBS session based on the MBS capability information; and a transmitter transmitting the first paging message to the other network apparatus.

BRIEF DESCRIPTION OF THE DRAWINGS

FIG. 8 is a diagram illustrating delivery modes according to an embodiment.

FIG. 17 is a diagram illustrating Option A of a supplementary note.

FIG. 18 is a diagram illustrating Option B of the supplementary note.

DESCRIPTION OF EMBODIMENTS

In an MBS, a user equipment in a Radio Resource Control (RRC) idle state or an RRC inactive state is notified of start of an MBS session by utilizing a paging mechanism, which is considered to enable streamlining of MBS reception, particularly multicast session reception.

The present disclosure provides a communication method, a network apparatus, and a user equipment that can smooth MBS reception by utilizing a paging mechanism.

A mobile communication system according to an embodiment is described with reference to the drawings. In the description of the drawings, the same or similar parts are denoted by the same or similar reference signs.

First Embodiment

Configuration of Mobile Communication System

Figure 1:
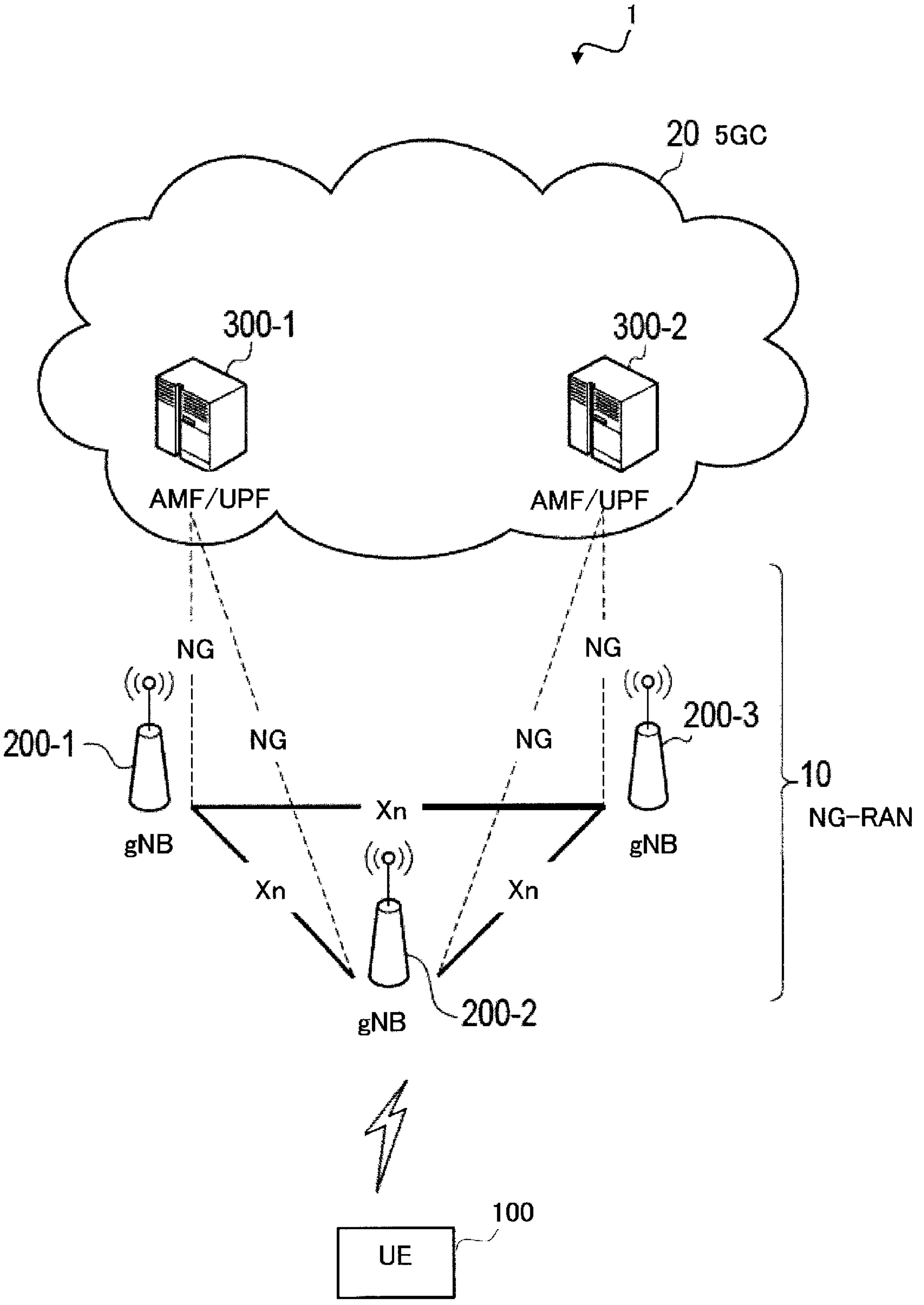
FIG. 1 is a diagram illustrating a configuration of a mobile communication system according to an embodiment.

FIG. 1 is a diagram illustrating a configuration of a mobile communication system according to a first embodiment. The mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20. Hereinafter, the NG-RAN 10 may be simply referred to as a "RAN 10". The 5GC 20 may be simply referred to as a core network (CN) 20.

The UE 100 is a mobile wireless communication apparatus. The UE 100 may be any apparatus as long as the UE 100 is an apparatus used by a user. Examples of the UE 100 include a mobile phone terminal (including a smartphone) or a tablet terminal, a notebook PC, a communication module (including a communication card or a chipset), a sensor or an apparatus provided at a sensor, a vehicle or an apparatus provided at a vehicle (Vehicle UE), or a flying object or an apparatus provided at a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signaling. The UPF controls data transfer. The AMF and UPF are connected to the gNB 200 via an NG interface which is an interface between a base station and the core network.

Figure 2:
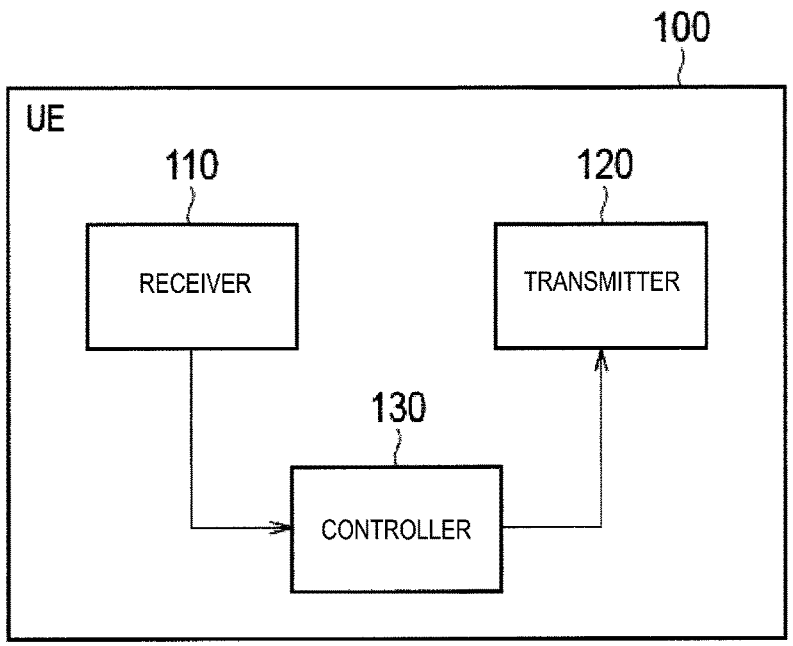
FIG. 2 is a diagram illustrating a configuration of a user equipment (UE) according to an embodiment.

FIG. 2 is a diagram illustrating a configuration of the UE 100 (user equipment) according to the first embodiment. The UE 100 includes a receiver 110, a transmitter 120, and a controller 130. The receiver 110 and the transmitter 120 constitute a wireless communicator that performs wireless communication with the gNB 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processing includes processing of each layer described below. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
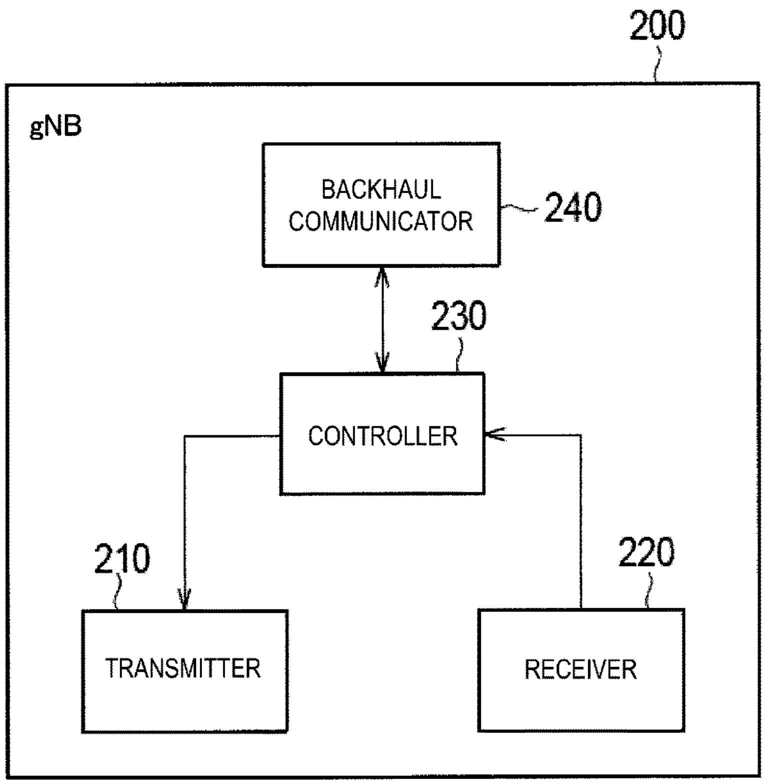
FIG. 3 is a diagram illustrating a configuration of a base station (gNB) according to an embodiment.

FIG. 3 is a diagram illustrating a configuration of the gNB 200 (base station) according to the first embodiment. The gNB 200 includes a transmitter 210, a receiver 220, a controller 230, and a backhaul communicator 240. The transmitter 210 and the receiver 220 constitute a wireless communicator that performs wireless communication with the UE 100. The backhaul communicator 240 constitutes a network communicator that performs communication with the CN 20.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processing in the gNB 200. Such processing includes processing of each layer described below. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the Xn interface, which is an inter-base station interface. The backhaul communicator 240 is connected to the AMF/UPF 300 via the NG interface, which is an interface between the base station and the core network. Note that the gNB 200 may include a Central Unit (CU) and a Distributed Unit (DU) (i.e., functions are divided), and the two units may be connected via an F1 interface, which is a fronthaul interface.

Figure 4:
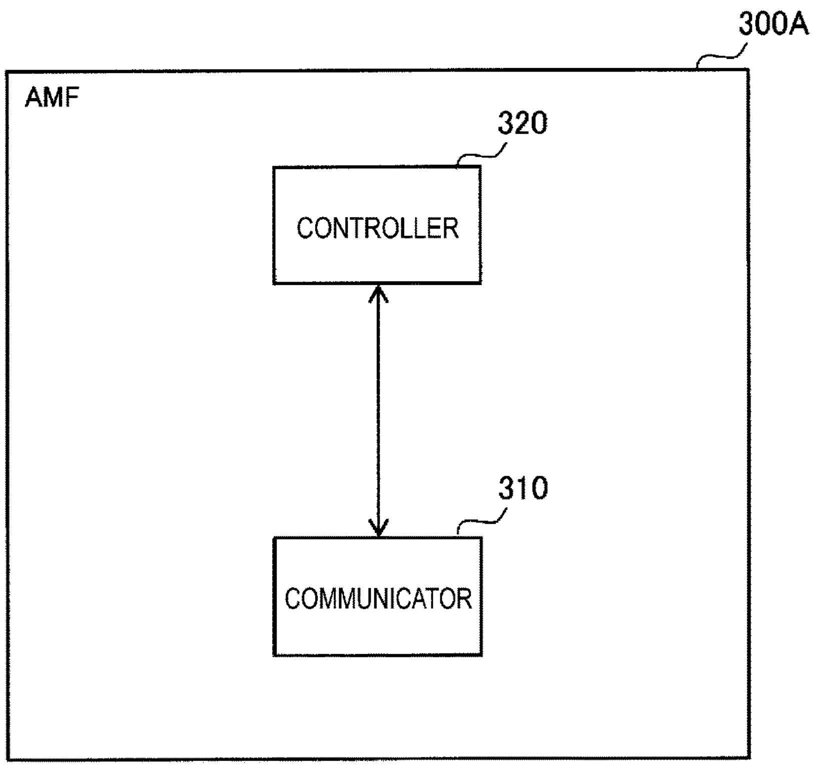
FIG. 4 is a diagram illustrating a configuration of an AMF (management apparatus) according to an embodiment.

FIG. 4 is a diagram illustrating a configuration of an AMF 300A (management apparatus) according to the first embodiment. The AMF 300A includes a communicator 310 and a controller 320.

The communicator 310 is connected to the gNB 200 via an NG interface, which is an interface between the base station and the core network. The communicator 310 communicates with the gNB 200.

The controller 320 performs various types of control and processing in the AMF 300A. Such processing includes processing of each layer described below. The controller 320 includes at least one processor and at least one memory. The memory stores a program to be executed by the processor and information to be used for processing by the processor. The processor may include a CPU. The CPU executes the program stored in the memory to thereby perform various types of processing.

Figure 5:
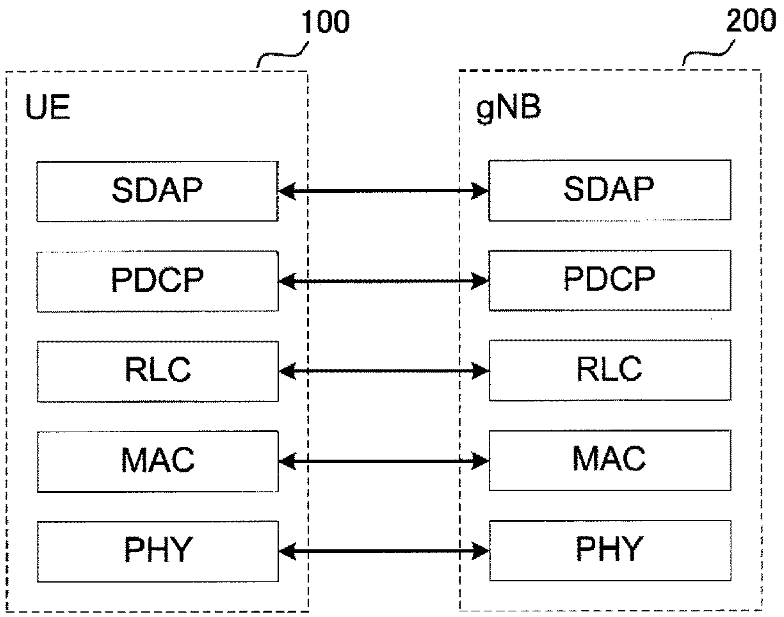
FIG. 5 is a diagram illustrating a configuration of a protocol stack of a radio interface of a user plane handling data.

FIG. 5 is a diagram illustrating a configuration of a protocol stack of a radio interface of a user plane handling data.

The radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel. The PHY layer of the UE 100 receives downlink control information (DCI) transmitted from the gNB 200 over a physical downlink control channel (PDCCH). Specifically, the UE 100 blind decodes the PDCCH using a radio network temporary identifier (RNTI) and acquires successfully decoded DCI as DCI addressed to the UE 100. The DCI transmitted from the gNB 200 is appended with CRC parity bits scrambled using the RNTI.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QOS) control performed by a core network and a radio bearer as the unit of QoS control performed by an Access Stratum (AS). Note that, when the RAN is connected to the EPC, the SDAP need not be provided.

Figure 6:
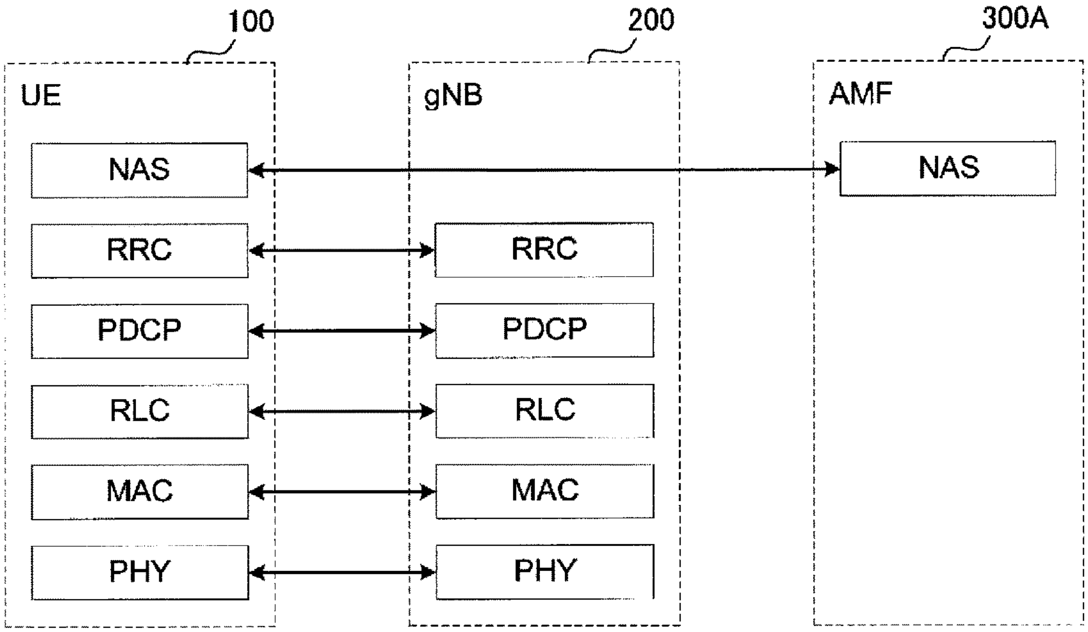
FIG. 6 is a diagram illustrating a configuration of a protocol stack of a radio interface of a control plane handling signaling (control signal).

FIG. 6 is a diagram illustrating a configuration of a protocol stack of a radio interface of a control plane handling signaling (a control signal).

The protocol stack of the radio interface of the control plane includes a Radio Resource Control (RRC) layer and a Non-Access Stratum (NAS) layer instead of the SDAP layer illustrated in FIG. 5.

RRC signaling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signaling is transmitted between the NAS layer of the UE 100 and the NAS layer of the AMF 300A. Note that the UE 100 includes an application layer other than the protocol of the radio interface.

Outline of MBS

An outline of an MBS according to the first embodiment will be described. The MBS is a service in which the NG-RAN 10 can provide broadcast or multicast, i.e., Point To Multipoint (PTM) data transmission to the UE 100. Assumed use cases (service types) of the MBS include public safety communication, mission critical communication, Vehicle to Everything (V2X) communication, IPv4 or IPV6 multicast delivery, Internet Protocol TeleVision (IPTV), group communication, and software delivery.

A broadcast service provides a service to every UE 100 within a particular service area for an application not requiring highly reliable QoS. An MBS session used for the broadcast service is referred to as a broadcast session.

A multicast service provides a service not to every UE 100, but to a group of UEs 100 participating in the multicast service (multicast session). An MBS session used for the multicast service is referred to as a multicast session. The multicast service can provide the same content to the group of UEs 100 through a method with higher radio efficiency than the broadcast service.

Figure 7:
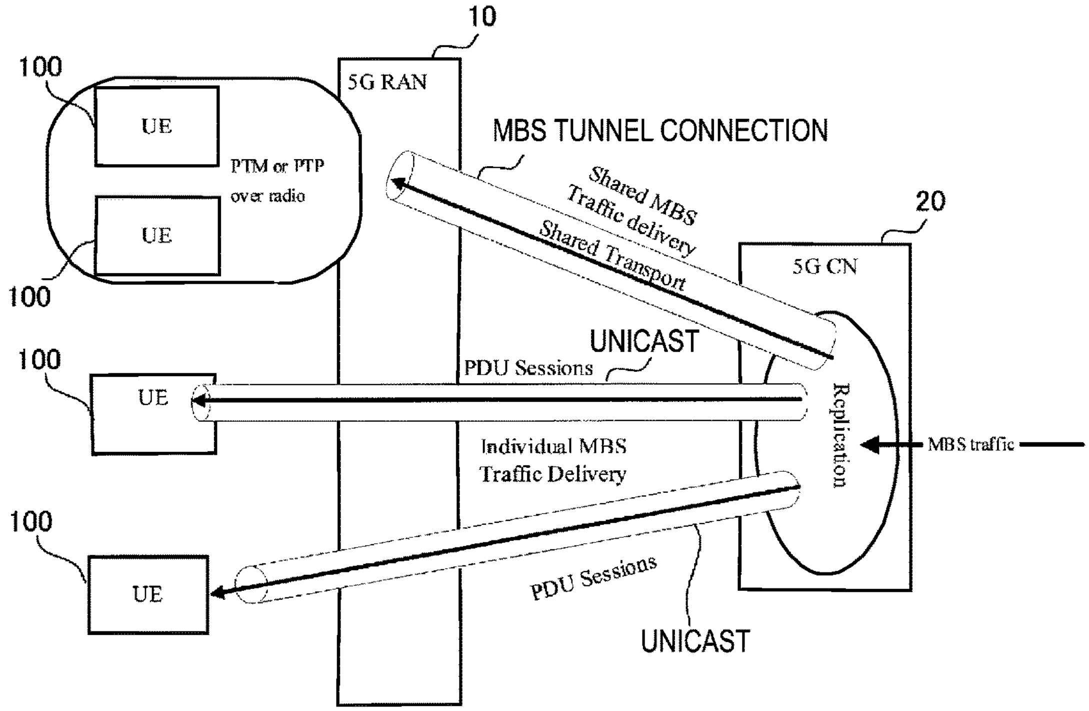
FIG. 7 is a diagram illustrating an outline of MBS traffic delivery according to an embodiment.

FIG. 7 is a diagram illustrating an outline of MBS traffic delivery according to the first embodiment.

MBS traffic (MBS data) is delivered from a single data source (application service provider) to a plurality of UEs. The 5G CN (5GC) 20, which is a 5G core network, receives the MBS data from the application service provider, generate a copy of the MBS data (replication), and delivers the copy.

From the viewpoint of the 5GC 20, two multicast delivery methods of 5GC Shared MBS Traffic delivery and 5GC Individual MBS Traffic delivery are possible.

In the 5GC Individual MBS Traffic delivery method, the 5GC 20 receives a single copy of MBS data packets and delivers individual copies of these MBS data packets to individual UEs 100 via PDU sessions of the respective UEs 100. Thus, one PDU session needs to be associated with a multicast session for each UE 100.

In the 5GC Shared MBS Traffic delivery method, the 5GC 20 receives a single copy of MBS data packets and delivers the single copy of these MBS packets to the RAN node (i.e., gNB 200). The gNB 200 receives the MBS data packets via MBS tunnel connection and delivers the MBS data packets to one or more UEs 100.

From the viewpoint of the RAN (5G RAN) 10, two delivery methods of Point-to-Point (PTP) and Point-to-Multipoint (PTM) are possible for wireless MBS data transmission in the 5GC Shared MBS Traffic delivery method. The PTP means unicast, and the PTM means multicast and broadcast.

In the PTP delivery method, the gNB 200 wirelessly delivers individual copies of the MBS data packets to individual UEs 100. On the other hand, in the PTM delivery method, the gNB 200 wirelessly delivers a single copy of the MBS data packets to a group of UEs 100. The gNB 200 can dynamically determine whether to use the PTM or the PTP as a method of delivering the MBS data to one UE 100.

The PTP and PTM delivery methods mainly relate to the user plane. Control modes of the MBS data delivery include two delivery modes of Delivery mode 1 and Delivery mode 2. FIG. 8 is a diagram illustrating the delivery modes according to the first embodiment.

Delivery mode 1 is a delivery mode that can be used by the UE 100 in the RRC connected state and is a delivery mode for high QoS requirements. Delivery mode 1 is used for a multicast session among MBS sessions. However, Delivery mode 1 may be used for a broadcast session. The UE 100 in the RRC idle state or RRC inactive state also can use Delivery mode 1.

MBS reception configuration in Delivery mode 1 is performed by UE-dedicated signaling. For example, the MBS reception configuration in Delivery mode 1 is performed using an RRC Reconfiguration message (or an RRC Release message), which is an RRC message unicasted from the gNB 200 to the UE 100.

The MBS reception configuration includes MBS traffic channel configuration information (hereinafter referred to as "MTCH configuration information") regarding the configuration of an MBS traffic channel for carrying MBS data. The MTCH configuration information includes MBS session information regarding an MBS session and scheduling information of an MBS traffic channel corresponding to the MBS session. The scheduling information of the MBS traffic channel may include a discontinuous reception (DRX) configuration of the MBS traffic channel. The discontinuous reception configuration may include one or more parameters of a timer value (On Duration Timer) for defining an On Duration (reception period), a timer value (Inactivity Timer) for extending the On Duration, a Scheduling Period or a DRX cycle, an offset value (Start Offset, DRX Cycle Offset) of a start subframe of the scheduling or DRX cycle, a start delay slot value (Slot Offset) of the On Duration Timer, a timer value (Retransmission Timer) for defining a maximum time until retransmission, and a timer value (HARQ RTT Timer) for defining a minimum period until DL allocation for HARQ retransmission.

Note that the MBS traffic channel is a type of logical channel and may be referred to as an MTCH. The MBS traffic channel is mapped to a downlink shared channel (DL-SCH), which is a type of transport channel.

Delivery mode 2 is a delivery mode that can be used not only by the UE 100 in the RRC connected state but also by the UE 100 in the RRC idle state or the RRC inactive state and is a delivery mode for low QoS requirements. Delivery mode 2 is used for a broadcast session among the MBS sessions. However, Delivery mode 2 may also be applicable to a multicast session.

MBS reception configuration in Delivery mode 2 is performed by broadcast signaling. For example, the MBS reception configuration in Delivery mode 2 is performed using a logical channel broadcasted from the gNB 200 to the UE 100, for example, a broadcast control channel (BCCH) and/or a multicast control channel (MCCH). The UE 100 can receive the BCCH and the MCCH using a dedicated RNTI predefined in the technical specifications, for example. The RNTI for BCCH reception may be an SI-RNTI, and the RNTI for MCCH reception may be an MCCH-RNTI.

In Delivery mode 2, the UE 100 may receive MBS data through the following three procedures. First, the UE 100 receives MCCH configuration information through an SIB (MBS-SIB) transmitted on a BCCH from the gNB 200. Second, the UE 100 receives an MCCH from the gNB 200 based on the MCCH configuration information. The MCCH carries MTCH configuration information. Third, the UE 100 receives an MTCH (MBS Data) based on the MTCH configuration information. Hereinafter, the MTCH configuration information and/or the MCCH configuration information may be referred to as MBS configuration information.

In Delivery mode 1 and Delivery mode 2, the UE 100 may receive the MTCH using a group RNTI (G-RNTI) allocated from the gNB 200. The G-RNTI corresponds to the RNTI for MTCH reception. The MBS reception configuration (MTCH configuration information) may include the G-RNTI.

Note that the network can provide different MBS services for different MBS sessions. Each MBS session is identified by at least one selected from the group consisting of a Temporary Mobile Group Identity (TMGI), a source specific IP multicast address (including a source unicast IP address of an application function, an application server, or the like and an IP multicast address indicating a destination address), a session identifier, and a G-RNTI. At least one selected from the group consisting of the TMGI, the source specific IP multicast address, and the session identifier is referred to as an MBS session identifier (MBS session ID). The TMGI, the source specific IP multicast address, the session identifier, and the G-RNTI are collectively referred to as MBS session information.

Figure 9:
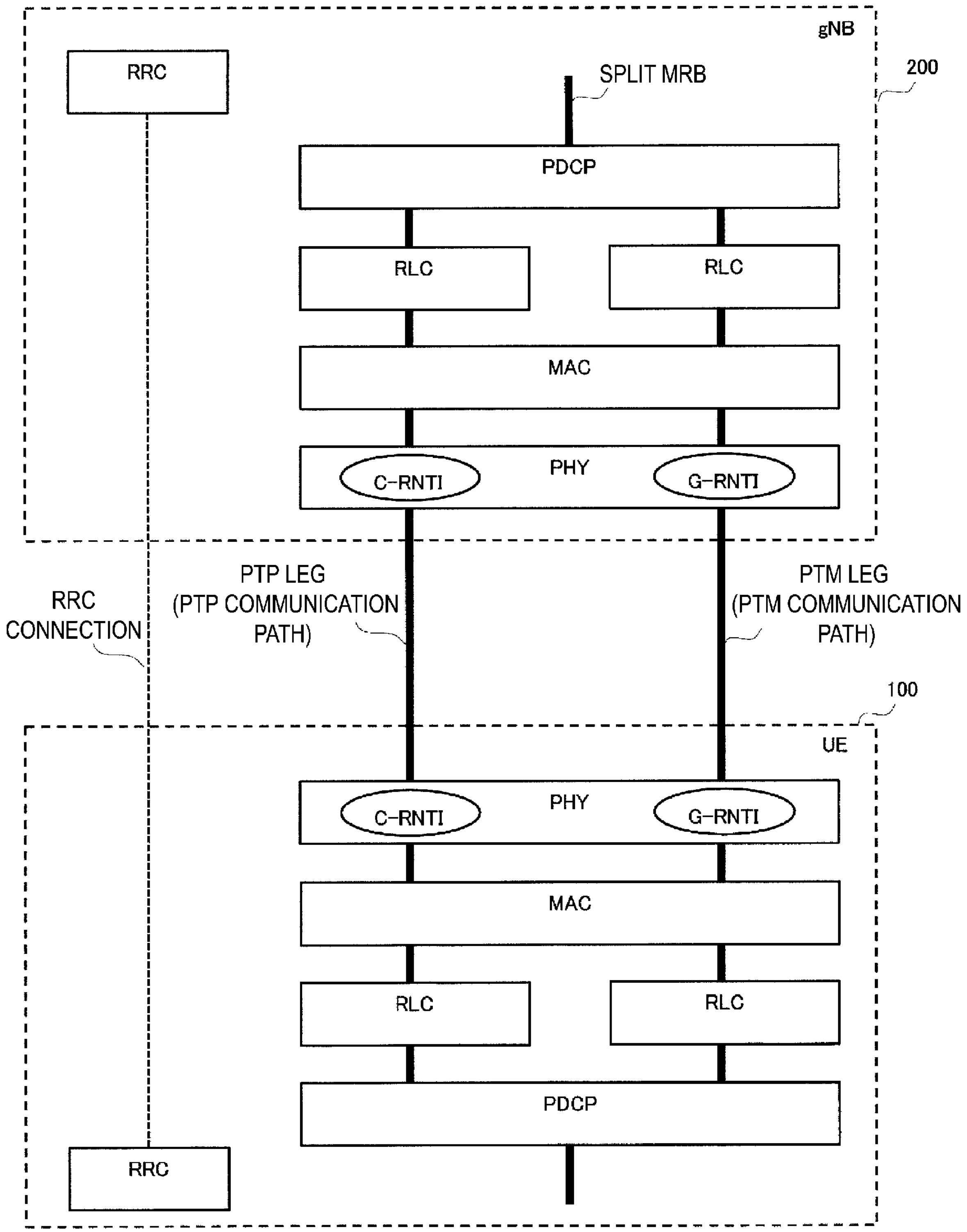
FIG. 9 is a diagram illustrating a split multicast radio bearer (MRB) according to an embodiment.

FIG. 9 illustrates a split multicast radio bearer (MRB) according to the first embodiment. The MRB may be a type of data radio bearer (DRB). The split MRB may be used in Delivery mode 1 described above.

The gNB 200 may configure, in the UE 100, an MRB separated into a PTP communication path and a PTM communication path. This allows the gNB 200 to dynamically switch MBS data transmission to the UE 100 between the PTP (PTP communication path) and the PTM (PTM communication path). Alternatively, the gNB 200 can increase reliability by doubly transmitting the same MBS data using both the PTP (PTP communication path) and the PTM (PTM communication path). Hereinafter, the PTP communication path is referred to as a PTP leg, and the PTM communication path is referred to as a PTM leg. A function unit corresponding to each layer is referred to as an entity.

A predetermined layer terminating the split is the MAC layer (HARQ), the RLC layer, the PDCP layer, or the SDAP layer. Although an example in which the predetermined layer terminating the split is the PDCP layer will be mainly described below, the predetermined layer may be the MAC layer (HARQ), the RLC layer, or the SDAP layer.

Each of a PDCP entity of the gNB 200 and a PDCP entity of the UE 100 separates an MRB, which is a bearer (data radio bearer) used for an MBS, into a PTP leg and a PTM leg. Note that the PDCP entity is provided for each bearer.

Each of the gNB 200 and the UE 100 includes two RLC entities provided for the respective legs, one MAC entity, and one PHY entity. The PHY entity may be provided for each leg. In the case of dual connectivity in which the UE 100 communicates with two gNBs 200, the UE 100 may have two MAC entities.

The PHY entity transmits and receives data of the PTP leg using a Cell Radio Network Temporary Identifier (C-RNTI) allocated one-to-one to the UE 100. The PHY entity transmits and receives data of the PTM leg using a G-RNTI allocated one-to-one to an MBS session. The C-RNTI is different for each UE 100, and the G-RNTI is a common RNTI to a plurality of UEs 100 receiving one MBS session.

In order to perform PTM transmission (multicast or broadcast) of MBS data from the gNB 200 to the UE 100 using the PTM leg, the split MRB needs to be configured from the gNB 200 to the UE 100 and the PTM leg needs to be activated. In other words, when the split MRB is configured in the UE 100 but the PTM leg is deactivated, the gNB 200 cannot perform PTM transmission of the MBS data using the PTM leg.

In order for the gNB 200 and the UE 100 to perform PTP transmission (unicast) of MBS data using the PTP leg, the split MRB needs to be configured from the gNB 200 to the UE 100 and the PTP leg needs to be activated. In other words, when the split MRB is configured in the UE 100 but the PTP leg is deactivated, the gNB 200 cannot perform PTP transmission of the MBS data using the PTP leg.

In a state in which the PTM leg is activated, the UE 100 monitors the PDCCH to which the G-RNTI associated with the MBS session is applied (i.e., performs blind decoding of the PDCCH using the G-RNTI). The UE 100 may monitor the PDCCH only on the scheduling occasion of the MBS session.

In a state in which the PTM leg is deactivated, the UE 100 does not monitor the PDCCH to which the G-RNTI associated with the MBS session is applied (i.e., does not perform blind decoding of the PDCCH using the G-RNTI).

In a state in which the PTP leg is activated, the UE 100 monitors the PDCCH to which the C-RNTI is applied. When the Discontinuous Reception (DRX) in the PTP leg is configured, the UE 100 monitors the PDCCH during the configured activation period (On Duration). When the cell (frequency) associated with the MBS session is designated, the UE 100 may monitor the PDCCH of the cell even when the cell is deactivated.

In a state in which the PTP leg is deactivated, the UE 100 may monitor the PDCCH to which the C-RNTI is applied in preparation for normal unicast downlink transmission of data other than MBS data. However, when the cell (frequency) associated with the MBS session is designated, the UE 100 may not monitor the PDCCH for the MBS session.

It is assumed that the above-described split MRB is configured using an RRC message (for example, an RRC Reconfiguration message) transmitted from the RRC entity of the gNB 200 to the RRC entity of the UE 100.

Figure 10:
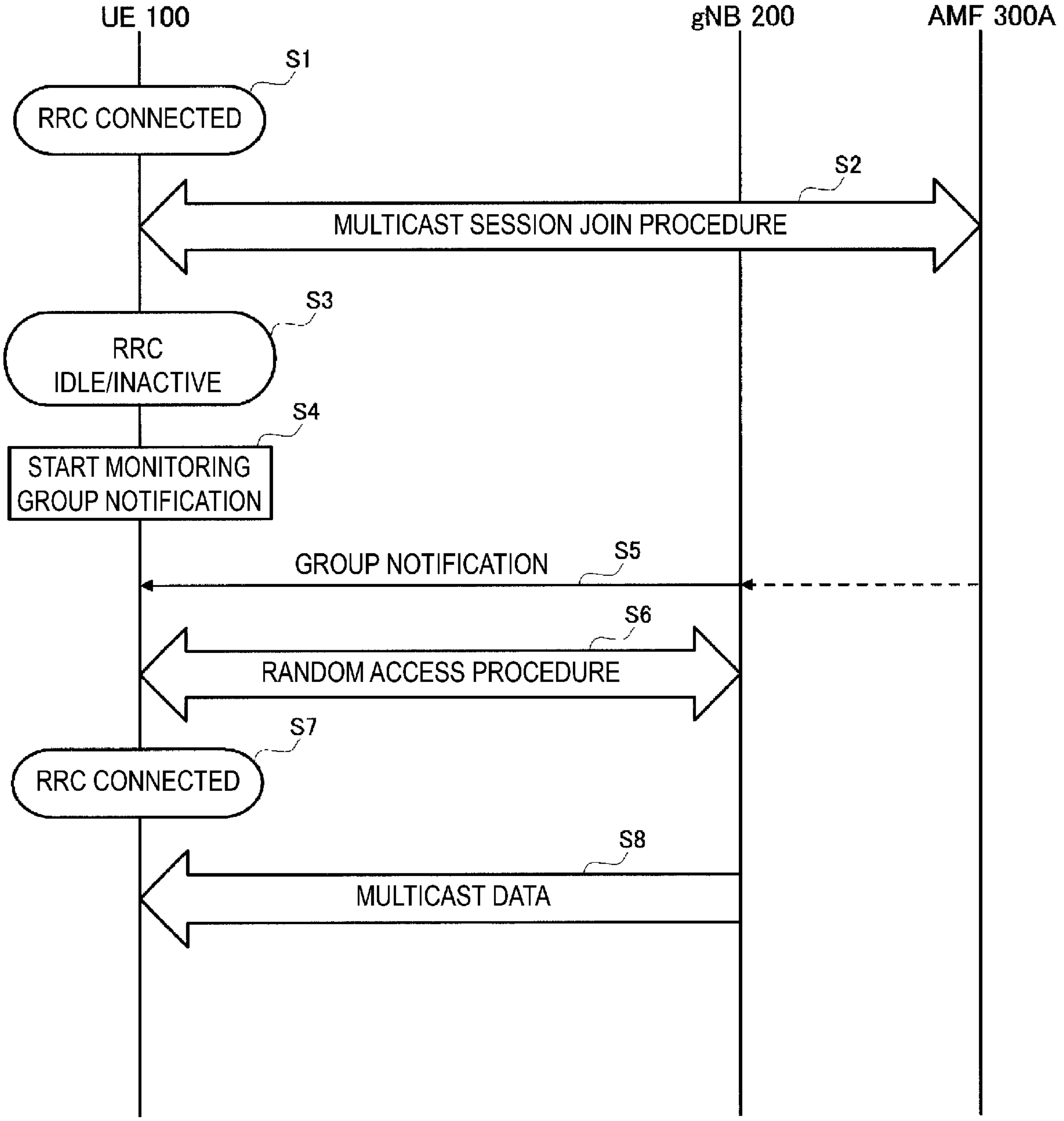
FIG. 10 is a diagram illustrating an operation regarding group notification according to an embodiment.

FIG. 10 is a diagram illustrating an operation regarding group notification according to the first embodiment. Here, a case is mainly assumed in which the UE 100 in the RRC connected state receives MBS data (i.e., multicast data) multicasted from the gNB 200 in Delivery mode 1. Thus, an MBS session is assumed to be a multicast session. The multicast session is mapped to a PTM leg or PTM bearer (MRB). An MBS traffic channel (MTCH) is used for multicast data transmission from the gNB 200 to the UE 100.

After joining the multicast session, the UE 100 transitions to the RRC idle state or the RRC inactive state and waits for start of the multicast session. The UE 100 in the RRC idle state or the RRC inactive state receives a group notification that indicates start (activation) of the multicast session in which the UE 100 is participating in and that is transmitted from the network to a group to which the UE 100 belongs. The group notification is assumed to be a type of paging message. The UE 100 transitions to the RRC connected state upon receipt of the group notification and receives multicast data of the multicast session from the gNB 200.

Hereinafter, the RAN 10 (gNB 200) and the CN 20 (in particular, AMF 300A) are collectively referred to as a "network" as appropriate. The AMF 300A is an example of a core network (CN) apparatus. The AMF 300A manages the MBS session (multicast session) in cooperation with a session management apparatus. The session management apparatus may be an (MB-)SMF.

In Step S1, the UE 100 is in the RRC connected state. It is assumed that the UE 100 is interested in a certain multicast session (hereinafter referred to as a "target multicast session"). The expression "interested in a multicast session" means that an upper layer of the UE 100 requests or desires reception of the multicast session. The upper layer includes the NAS layer. The upper layer may further include an application.

In Step S2, the UE 100 (NAS entity) performs, on the network, a multicast session join procedure for joining the target multicast session. For example, the UE 100 joins the target multicast session by transmitting, to the AMF 300A, a first NAS message for requesting joining to the target multicast session and receiving, from the AMF 300A, a second NAS message for approving the joining to the target multicast session. The expression "joining to the target multicast session" means that the UE 100 is registered in the CN apparatus as a member of a UE group (multicast group) receiving the multicast session. Note that the UE 100 may join the multicast session while the multicast session is active (during transmission). The UE 100 may join the multicast session while the multicast session is inactive (during waiting for start of transmission or during interruption of transmission).

In Step S3, the UE 100 transitions to the RRC idle state or the RRC inactive state. Specifically, the UE 100 transitions to the RRC idle state or the RRC inactive state by receiving an RRC Release message from the gNB 200. Prior to Step S3, the UE 100 may transmit, to the gNB 200, an RRC message (for example, a UE Assistance Information message) including an information element for prompting the UE 100 to transition to the RRC idle state or the RRC inactive state. The gNB 200 may determine to cause the UE 100 to transition to the RRC idle state or the RRC inactive state when the multicast session in which the UE 100 is interested is inactive.

In Step S4, the UE 100 starts monitoring a group notification from the gNB 200. The group notification may be a paging message transmitted from the gNB 200. For example, the UE 100 monitors the group notification on a paging occasion (PO) of a periodically configured paging frame (PF). The group notification may be to notify session start of the multicast session. The session start may be activation of the multicast session from an inactive state.

In Step S5, the gNB 200 transmits a group notification addressed to a group including the UE 100 or a group in which the UE 100 is interested. The gNB 200 may transmit the group notification (paging message) to the UE 100 in response to a paging request (group notification request) from the AMF 300A. The group notification may include at least one selected from the group consisting of a multicast session identifier indicating the group, an identifier of each UE belonging to the group, and a multicast session identifier associated with the identifier. The UE 100 receiving the group notification including such an identifier can recognize start of the target multicast session that the UE 100 joins. The start of the target multicast session may be activation of transmission of multicast data in the target multicast session. The start of the target multicast session may be transition to a state in which transmission of the multicast data can be started in the target multicast session.

In Step S6, the UE 100 performs a random access procedure on the gNB 200 for reception in the target multicast session.

In Step S7, the UE 100 transitions to the RRC connected state through the random access procedure.

In Step S8, the UE 100 in the RRC connected state receives multicast data of the target multicast session from the gNB 200. The gNB 200 may perform configuration for receiving the target multicast session on the UE 100 before the data reception. The configuration is, for example, an RRC Reconfiguration message including an MRB configuration.

Operation of Mobile Communication System

An operation of the mobile communication system 1 according to the first embodiment will be described.

In the operation regarding the group notification described above, when the gNB 200 does not have the MBS function, the gNB 200 cannot appropriately handle the group notification from the AMF 300A (specifically, the paging message including the MBS session identifier). In this case, it is conceivable that the AMF 300A transmits, to the gNB 200, a paging message including the identifier of the UE 100 participating in the multicast session, instead of the paging message including the MBS session identifier.

As a result, when the multicast session starts, the gNB 200 supporting the MBS function transmits the paging message including the MBS session identifier as the group notification, and the gNB 200 not supporting the MBS function transmits the paging message including the UE identifier as the group notification. Thus, when the AMF 300A does not recognize whether the gNB 200 supports the MBS function, there is a problem that the AMF 300A cannot generate an appropriate paging message.

Note that the paging started by the AMF 300A is referred to as CN paging. The CN paging is mainly used to call the UE 100 in the RRC idle state. In contrast, paging started by the RAN 10 (gNB 200) is referred to as RAN paging. The RAN paging is used to call the UE 100 in the RRC inactive state. The RAN paging is also considered to have the above-described problem.

Figure 11:
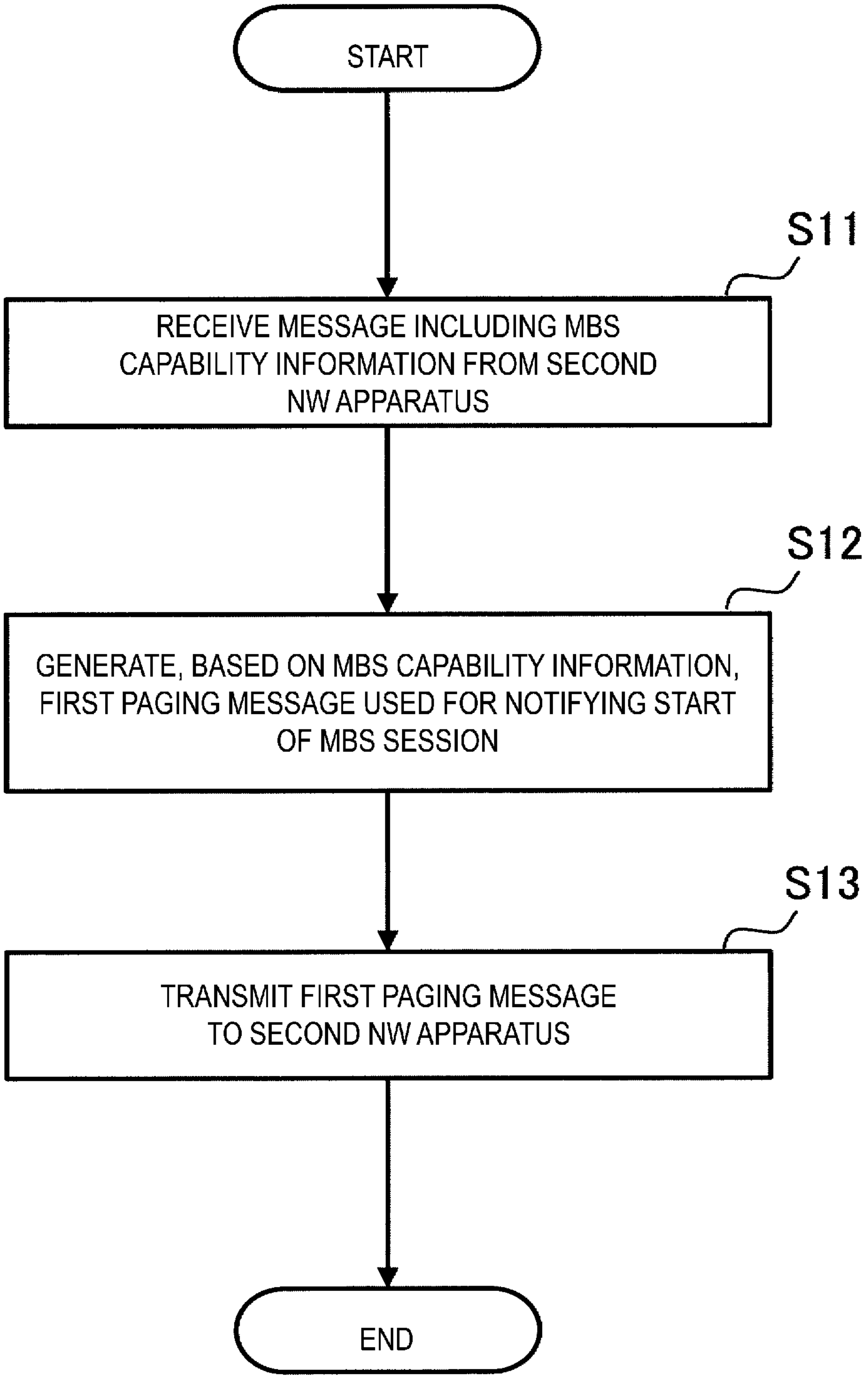
FIG. 11 is a diagram illustrating an operation of a mobile communication system according to a first embodiment.

FIG. 11 is a diagram illustrating an operation of the mobile communication system 1 according to the first embodiment.

In Step S11, a first network (NW) apparatus included in the NW of the mobile communication system 1 receives, from a second NW apparatus included in the NW, a message including multicast broadcast service (MBS) capability information regarding whether the second NW apparatus supports an MBS function.

In Step S12, the first NW apparatus generates a first paging message used for notifying start of an MBS session based on the MBS capability information received in Step S11. For example, the first NW apparatus generates a first paging message including an MBS session identifier indicating the MBS session when the MBS capability information indicates that the second NW apparatus supports the MBS function. On the other hand, the first NW apparatus generates a first paging message including a UE identifier indicating the UE 100 participating in the MBS session when the MBS capability information indicates that the second NW apparatus does not support the MBS function.

In Step S13, the first NW apparatus transmits the first paging message generated in Step S12 to the second NW apparatus. The second NW apparatus transmits, through wireless communication, a second paging message based on the first paging message from the first NW apparatus. The second paging message may be a type of RRC message.

Accordingly, the first NW apparatus can appropriately generate the paging message used as the group notification in accordance with whether the second NW apparatus supports the MBS function. Thus, the UE 100 in the RRC idle state or the RRC inactive state can be appropriately notified of start of the MBS session by utilizing the paging mechanism, which is considered to enable smoothing of MBS reception, particularly multicast session reception.

In Step S11, when the second NW apparatus does not support the MBS function, the first NW apparatus may receive the message including the MBS capability information indicating that the second NW apparatus does not support the MBS function. Thus, it can be clearly understood that the second NW apparatus does not support the MBS function.

The first NW apparatus may be the AMF 300A (management apparatus) included in the CN 20. The second NW apparatus may be the gNB 200 included in the RAN 10. The AMF 300A may receive the message including the MBS capability information on an NG interface between the AMF 300A and the gNB 200. Accordingly, the AMF 300A can appropriately generate the CN paging message (first paging message) used as the group notification in accordance with whether the gNB 200 supports the MBS function.

In such an example, the communicator 310 of the AMF 300A constitutes a receiver receiving, from the gNB 200, the message including the MBS capability information regarding whether the gNB 200 supports the MBS function. The controller 320 of the AMF 300A generates the CN paging message (first paging message) used for notifying start of the MBS session based on the MBS capability information. The communicator 310 of the AMF 300A constitutes a transmitter transmitting the first paging message to another NW apparatus.

Alternatively, the first NW apparatus may be the gNB 200 included in the RAN 10. The second NW apparatus may be a neighboring gNB 200 included in the RAN 10. The gNB 200 may receive the message including the MBS capability information on an Xn interface between the gNB 200 and the neighboring gNB 200. Accordingly, the gNB 200 can appropriately generate and transmit the RAN paging message (first paging message) used as the group notification in accordance with whether the neighboring gNB 200 supports the MBS function. For example, the gNB 200 transmits, as the first paging message, the RAN paging message including the MBS session identifier indicating the MBS session to be started to the neighboring gNB 200 supporting the MBS function.

In such an example, the backhaul communicator 240 of the gNB 200 constitutes a receiver receiving, from the neighboring gNB 200, the message including the MBS capability information regarding whether the neighboring gNB 200 supports the MBS function. The controller 230 of the gNB 200 generates the RAN paging message (first paging message) used for notifying start of the MBS session based on the MBS capability information. The communicator 310 of the AMF 300A constitutes a transmitter transmitting the first paging message to another NW apparatus.

Alternatively, the first NW apparatus may be the CU included in the gNB 200. The second NW apparatus may be the DU included in the gNB 200. The CU may receive the message including the MBS capability information on an F1 interface between the CU and the DU. Accordingly, the gNB 200 can appropriately generate and transmit the paging message (first paging message) used as the group notification in accordance with whether the neighboring gNB 200 supports the MBS function. Note that the DU includes lower layers (for example, the RLC layer, the MAC layer, and the PHY layer) in the above protocol stack. The CU includes upper layers, for example, the RRC layer, the SDAP layer, and the PDCP layer, in the above protocol stack.

The message including the MBS capability information may be a setup message used for setup of a network interface (e.g., NG interface, Xn interface, or F1 interface). This allows the first NW apparatus to grasp the MBS-related capability of the second NW apparatus when the network interface with the second NW apparatus is set up.

The message including the MBS capability information may be a configuration update message used for configuration update of the second NW apparatus. This allows the first NW apparatus to grasp the MBS-related capability of the second NW apparatus when the configuration of the second NW apparatus is updated.

The MBS capability information may include at least one piece of information selected from the group consisting of information indicating the presence or absence of the MBS function, information indicating the presence or absence of the function of performing MBS reception configuration by signaling dedicated for the UE 100 (e.g., function of Delivery mode 1), information indicating the presence or absence of the function of performing MBS reception configuration by broadcast signaling (e.g., function of Delivery mode 2), information indicating the presence or absence of the function of delivering a multicast session (e.g., function of Delivery mode 1), information indicating the presence or absence of the function of delivering a broadcast session (e.g., function of Delivery mode 2), and information indicating the presence or absence of the function of handling the split MRB. The MBS capability information may include this information for each cell managed by the second NW apparatus. As a result, the first NW apparatus can grasp the detailed MBS-related capability of each cell of the second NW apparatus.

Example

First to third examples of the first embodiment will be described based on the configuration and operation described above. These examples can not only be separately and independently implemented, but can also be implemented in combination of two or more thereof. In an operation flowchart of each example described below, all steps may not be necessarily performed, and only some of the steps may be performed. In an operation flowchart of each example described below, the order of the steps may be changed.

(1) First Example

Figure 12:
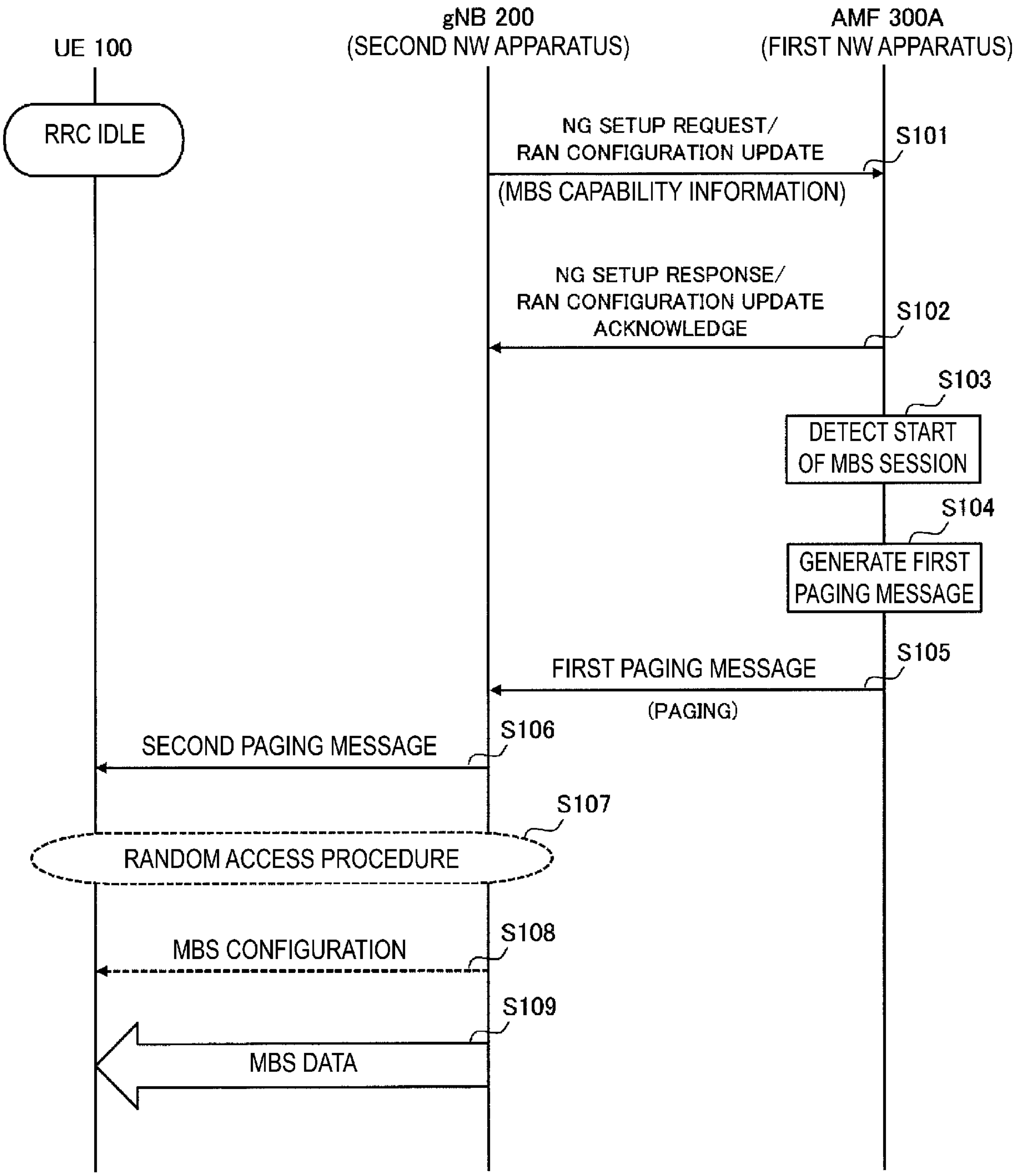
FIG. 12 is a diagram illustrating a first example of the first embodiment.

FIG. 12 is a diagram illustrating the first example of the first embodiment. In the first example, the first NW apparatus is the AMF 300A (management apparatus) included in the CN 20, and the second NW apparatus is the gNB 200 included in the RAN 10. The first example relates to CN paging.

In Step S101, the gNB 200 transmits an NG SETUP REQUEST message to the AMF 300A to set up an NG interface with the AMF 300A. The NG SETUP REQUEST message may include at least one piece of capability information selected from the group consisting of information indicating that the MBS function is supported, information indicating that each of the function of Delivery mode 1 and the function of Delivery mode 2 is supported, and information indicating that each of the multicast session delivery function and the broadcast session delivery function is supported. The NG SETUP REQUEST message may include information for associating the capability information with a cell (cell identifier). For example, a set of the cell identifier and the capability information may be included for each cell managed by the gNB 200. Instead of the NG SETUP REQUEST message, a RAN CONFIGURATION UPDATE message may include the capability information (and the cell identifier).

The AMF 300A grasps the MBS capability of the gNB 200 based on the message from the gNB 200.

In Step S102, the AMF 300A transmits an NG SETUP RESPONSE message to the gNB 200. The NG SETUP RESPONSE message may include, regarding the AMF 300A (CN 20), at least one piece of information selected from the group consisting of information indicating that the MBS function is supported, information indicating that each of the multicast session delivery function and the broadcast session delivery function is supported, information indicating that the 5GC Shared MBS Traffic delivery (Shared delivery) is supported, and the MBS session identifier during/before delivery. Instead of the NG SETUP RESPONSE message, the AMF 300A may include these pieces of information in a RAN CONFIGURATION UPDATE ACKNOWLEDGE message or an AMF CONFIGURATION UPDATE message and transmit the message to the gNB 200.

In Step S103, the AMF 300A determines (detects) start of the MBS session by receiving a start notification of the MBS session from the (MB-)SMF. The start notification of the MBS session may be an MBS Session Notification Request message for starting multicast. The start notification of the MBS session may be an MBS Session Resource Setup Request message for starting broadcast.

In Step S104, the AMF 300A generates a PAGING message (first paging message) to be transmitted to the gNB 200. When the gNB 200 supports the MBS function, the AMF 300A includes the MBS session identifier (Session ID, TMGI, Source Specific IP Multicast Address, etc.) in the PAGING message. Alternatively, another message (for example, a newly defined message) may be used instead of the PAGING message. When the gNB 200 does not support the MBS function, the AMF 300A includes, in the PAGING message, the identifiers (5G-S-TMSI) of UEs 100 that are participating in the MBS session and that are in a CM_IDLE state. Note that these identifiers may be included in the message in a list format (plurality of identifiers).

In Step S105, the AMF 300A transmits the PAGING message to the gNB 200.

In Step S106, based on information of this PAGING message, the gNB 200 transmits a paging message (second paging message) to the UE 100 by RRC. The second paging message includes the MBS session identifier of the MBS session to be started or the UE identifiers of the UEs 100 participating in the MBS session.

The UE 100 receiving the second paging message from the gNB 200 checks whether the second paging message includes the MBS session identifier of the MBS session that the UE 100 is participating in (i.e., the MBS session that the UE 100 is interested in receiving) or the UE identifier of the UE 100 itself. When the second paging message includes such an identifier, the UE 100 starts an operation for receiving MBS data of the MBS session. For example, the UE 100 performs a random access procedure on the gNB 200 to transition to the RRC connected state (Step S107) and receives an MBS reception configuration (MTCH configuration) from the gNB 200 by UE-dedicated RRC signaling (e.g., RRC Reconfiguration message) (Step S108). The UE 100 then receives MBS data from the gNB 200.

Note that when the gNB 200 does not support the MBS function, the UE 100 may receive the MBS data using the unicast PDU session illustrated in FIG. 7.

(2) Second Example

Figure 13:
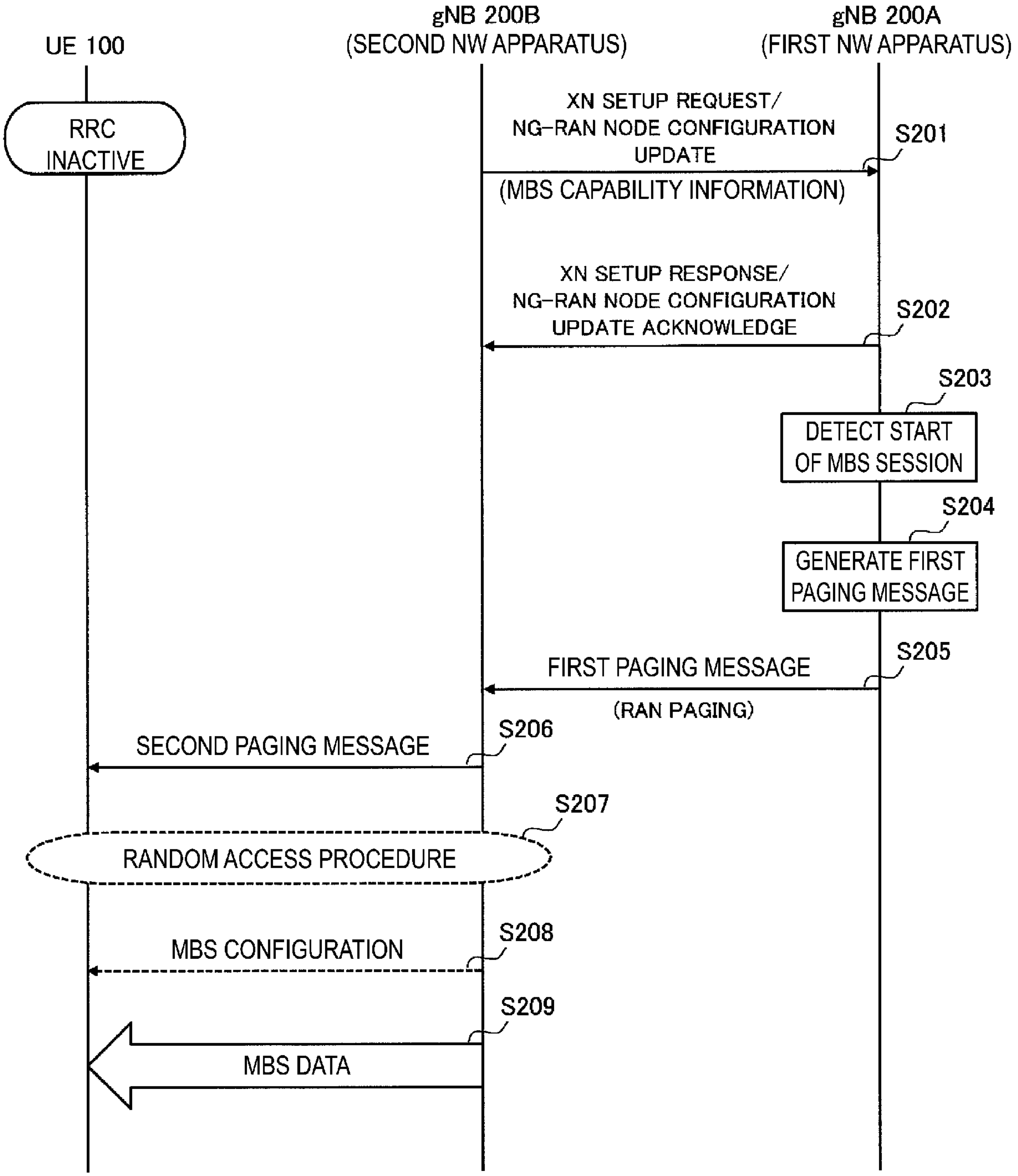
FIG. 13 is a diagram illustrating a second example of the first embodiment.

FIG. 13 is a diagram illustrating the second example of the first embodiment. In the second example, the first NW apparatus is a gNB 200A, and the second NW apparatus is a gNB 200B adjacent to the gNB 200A. The second example relates to RAN paging.

In Step S201, the gNB 200B transmits an XN SETUP REQUEST message to the gNB 200A to set up an Xn interface with the gNB 200A. The XN SETUP REQUEST message may include at least one piece of capability information selected from the group consisting of information indicating that the MBS function is supported, information indicating that each of the function of Delivery mode 1 and the function of Delivery mode 2 is supported, information indicating that each of the multicast session delivery function and the broadcast session delivery function is supported, and information indicating support of the PTP/PTM function and the split MRB. The XN SETUP REQUEST message may include information for associating the capability information with a cell (cell identifier). For example, a set of the cell identifier and the capability information may be included for each cell managed by the gNB 200B. The XN SETUP REQUEST message may include information regarding an MBS session being provided by the gNB 200B, for example, at least one piece of information selected from the group consisting of an MBS session identifier, a providing cell ID, and a delivery mode. Instead of the XN SETUP REQUEST message, an NG-RAN NODE CONFIGURATION UPDATE message may include the capability information.

The gNB 200A grasps the MBS capability of the gNB 200B based on the message from the gNB 200B.

In Step S202, the gNB 200A transmits an XN SETUP RESPONSE message to the gNB 200B. The XN SETUP RESPONSE message may include capability information and a cell identifier (here, information regarding the gNB 200A) as described above. Instead of the XN SETUP RESPONSE message, an NG-RAN NODE CONFIGURATION UPDATE ACKNOWLEDGE message may include the capability information (and the cell identifier).

In Step S203, the gNB 200A receives a notification of start of the MBS session (for example, a PAGING message or an MBS Session Start message for group notification) from the AMF 300A, thereby detecting the start of the MBS session. The gNB 200A detects, from retained UE context information, that the UE 100 interested in the MBS session is in the RRC inactive state. It is assumed that the gNB 200 has previously received information regarding UEs 100 participating in the MBS session from the CN 20 and has grasped MBS interest information for each UE 100.

In Step S204, the gNB 200A determines to perform RAN paging and generates a RAN PAGING message (Xn-AP) to be transmitted to the gNB 200B. When the gNB 200B supports the MBS function, the gNB 200A includes the MBS session identifier (Session ID, TMGI, Specific IP Multicast Address, etc.) of the MBS session in the RAN PAGING message. Alternatively, another message (for example, a newly defined message) may be used instead of the RAN PAGING message. When the gNB 200B does not support the MBS function, the gNB 200A includes, in the message, the UE identifiers (I-RNTIs) of UEs 100 that are participating in the MBS session and that are in the RRC inactive state. Note that these identifiers may be included in the message in a list format (plurality of identifiers).

In Step S205, the gNB 200A transmits the RAN PAGING message (first paging message) to the gNB 200B.

In Step S206, the gNB 200B transmits a paging message (second paging message) to the UE 100 by RRC based on information of the RAN PAGING message. The second paging message includes the MBS session identifier of the MBS session to be started or the UE identifiers of the UEs 100 participating in the MBS session.

Operations in steps S207 to S209 are same as, and/or similar to, those in the first example.

(3) Third Example

Figure 14:
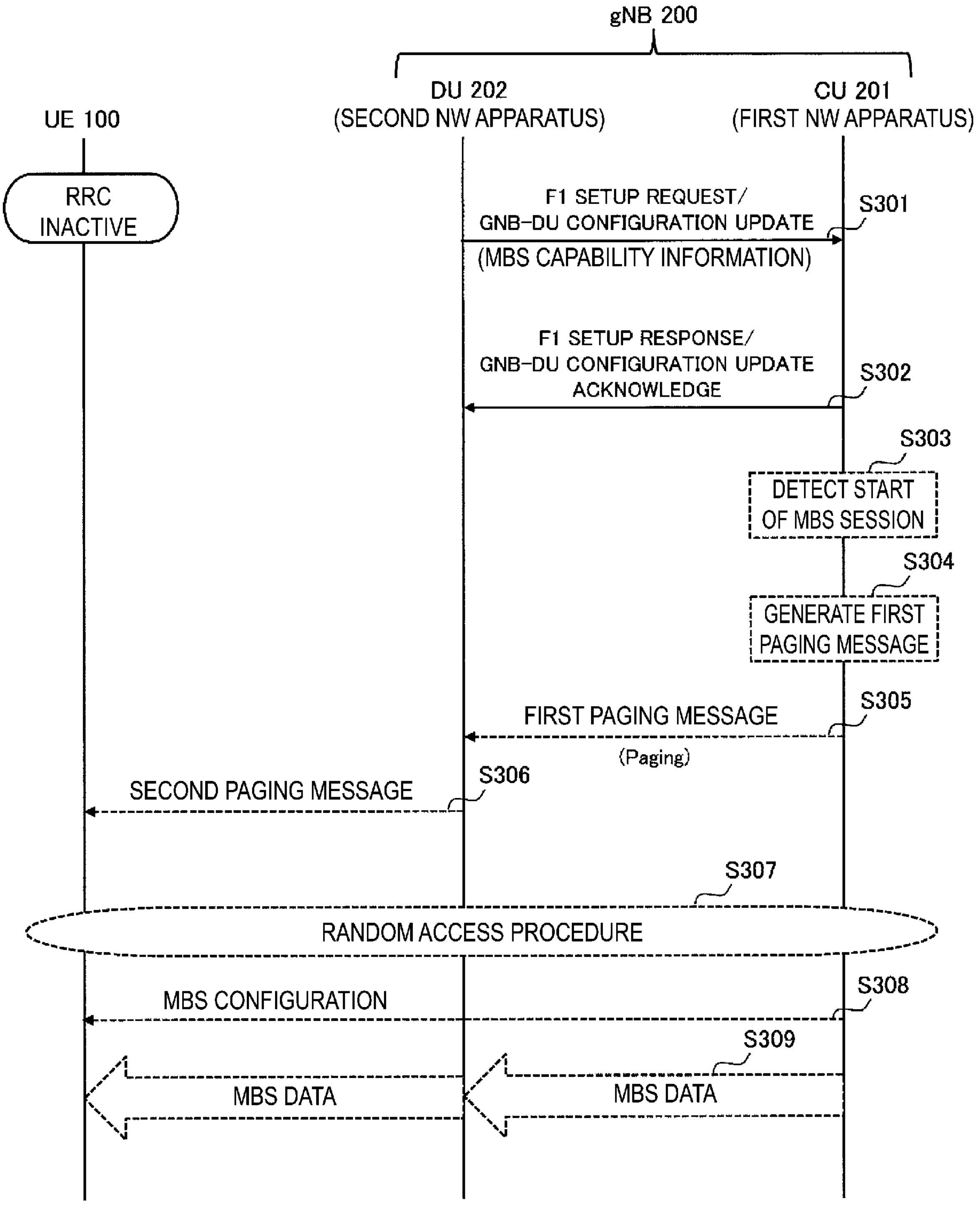
FIG. 14 is a diagram illustrating a third example of the first embodiment.

FIG. 14 is a diagram illustrating the third example of the first embodiment. In the third example, the first NW apparatus is the CU 201 of the gNB 200 and the second NW apparatus is the DU 202 of the gNB 200.

In Step S301, the DU 202 transmits an F1 SETUP REQUEST message to the CU 201 to set up an F1 interface with the CU 201. The F1 SETUP REQUEST message may include at least one piece of capability information selected from the group consisting of information indicating that the MBS function is supported, information indicating that each of the function of Delivery mode 1 and the function of Delivery mode 2 is supported, information indicating that each of the multicast session delivery function and the broadcast session delivery function is supported, information indicating support of the PTP/PTM function and the split MRB. The F1 SETUP REQUEST message may include information for associating the capability information with a cell (cell identifier). For example, a set of the cell identifier and the capability information may be included for each cell managed by the DU 202. Instead of the F1 SETUP REQUEST message, a GNB-DU CONFIGURATION UPDATE message may include the capability information (and the cell identifier).

In Step S302, the CU 201 transmits an F1 SETUP RESPONSE message to the DU 202. The F1 SETUP RESPONSE message may include capability information as described above. Instead of the F1 SETUP RESPONSE message, a GNB-CU CONFIGURATION UPDATE message may include the capability information of the CU 201.

The CU 201 grasps the MBS capability of the DU 202 based on the message from the DU 202 and grasps the capability information of the gNB 200 as a whole. The CU 201, using this information, communicates with the AMF 300A in the first example or communicates with the neighboring gNB 200 in the second example. The CU 201 may perform control so as not to use a split MRB configuration for the DU 202 not supporting the MBS function. In a manner same as, and/or similar to, the first and second examples, the CU 201 may perform a paging procedure (Steps S303 to S309) based on the MBS capability of the DU 202.

Second Embodiment

The second embodiment will be described mainly focusing on a difference from the above-described first embodiment.

In the above-described first embodiment, based on the group notification (second paging message) from the gNB 200, a large number of UEs 100 may simultaneously start random access procedures. Specifically, the large number of UEs 100 each may transmit a random access preamble on a physical random access channel (PRACH) to the gNB 200. Such random access is typically contention-based random access, and a contention about PRACH resources (in particular, random access preamble) may occur between the UEs 100. When such contention occurs, the UEs 100 cannot transition to the RRC connected state and cannot receive a multicast session delivered in Delivery mode 1.

On the other hand, a technique of causing the UE 100 to perform cell reselection using the paging message has been introduced in LTE in order to distribute a load between cells (for example, see 3GPP TS36.304 and TS36.331). Such a technique may be referred to as multi-carrier load distribution (MCLD), in particular, one-shot MCLD. The MCLD enables a plurality of UEs 100 in one cell to be distributed to other frequencies or other cells, which is considered to enable the above-described PRACH contention to be suppressed. In the second embodiment, a case is mainly assumed in which an execution request of the cell reselection (cell reselection by the MCLD) and the group notification are performed using the same paging message.

In such a case, when the UE 100 prioritizes the group notification and starts a random access procedure without performing the cell reselection, PRACH contention cannot be suppressed. Thus, when the execution request of the cell reselection and the group notification are performed using the same paging message, the UE 100 starts the random access procedure after performing the cell reselection.

Figure 15:
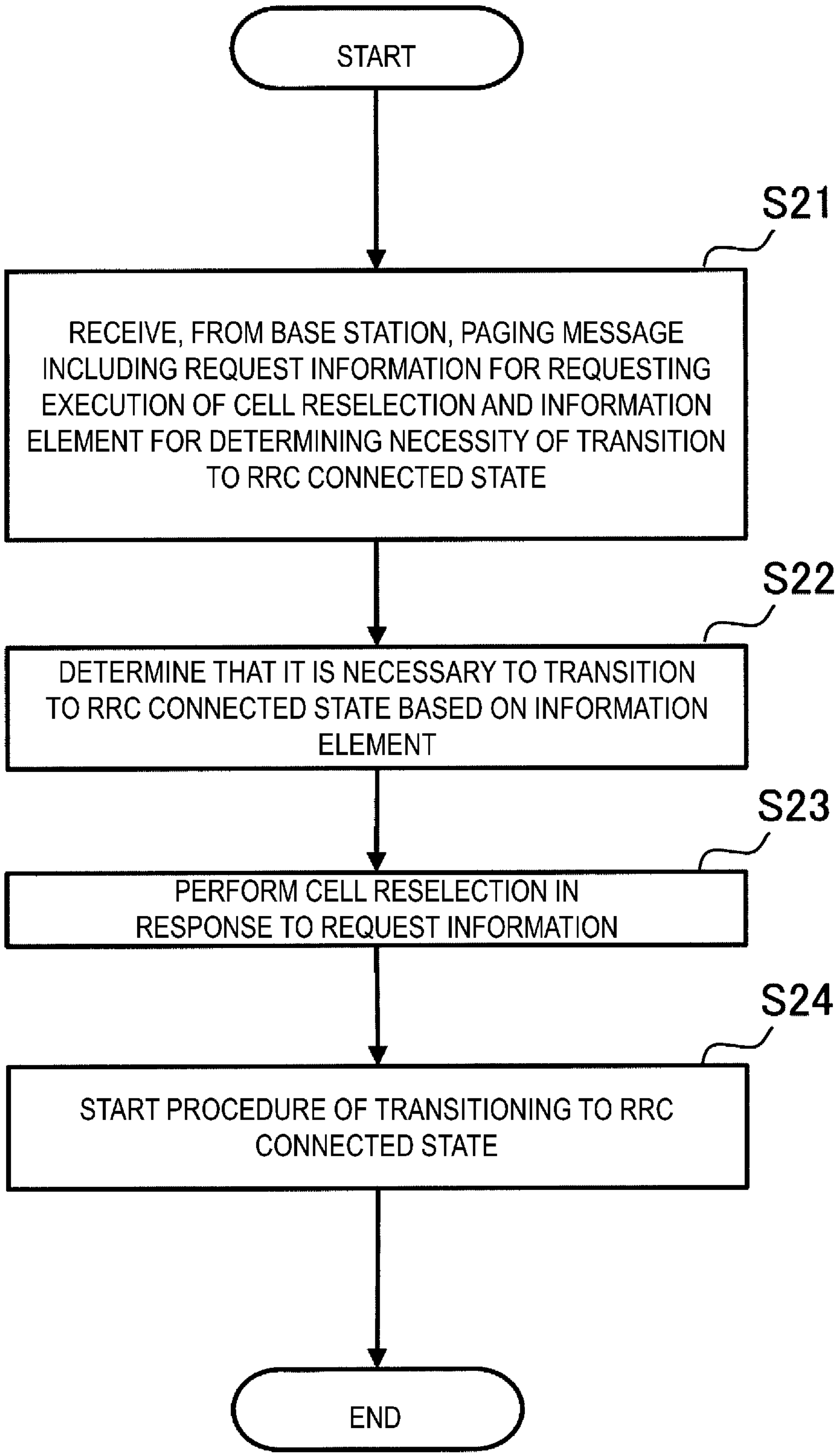
FIG. 15 is a diagram illustrating an operation of a mobile communication system according to a second embodiment.

FIG. 15 is a diagram illustrating an operation of a mobile communication system 1 according to the second embodiment.

In Step S21, the UE 100 in the RRC idle state or the RRC inactive state receives, from the gNB 200, a paging message including request information for requesting execution of cell reselection and an information element (hereinafter referred to as "predetermined information element") for determining whether the UE 100 needs to transition to the RRC connected state.

In Step S22, the UE 100 determines that it is necessary to transition to the RRC connected state based on the predetermined information element included in the paging message received in Step S21. For example, the predetermined information element is an MBS session identifier indicating an MBS session to be started. When the UE 100 is interested in receiving the MBS session indicated by the MBS session identifier included in the paging message, the UE 100 determines that it is necessary to transition to the RRC connected state. Alternatively, the predetermined information element may be a UE identifier of a calling target. The UE 100 determines that it is necessary to transition to the RRC connected state when the UE identifier included in the paging message matches the UE identifier of the UE 100 itself.

In Step S23, the UE 100 performs cell reselection in response to the request information included in the paging message received in Step S21. For example, the UE 100 probabilistically selects a cell reselection target from among candidate cells or candidate frequencies based on the unique identifier of the UE 100. Information regarding the candidate cells or candidate frequencies may be provided to the UE 100 using a system information block from the gNB 200. Each candidate cell or each candidate frequency may be associated with an adjustment value for adjusting the probability that the candidate cell or the candidate frequency is selected. The UE 100 selects a cell reselection target based on a value calculated from the unique identifier of the UE 100 and the adjustment value and sets the selected target to have the highest priority of cell reselection, thereby performing cell reselection to the selected target.

In Step S24, the UE 100 starts a procedure (random access procedure) of transitioning to the RRC connected state in the reselected cell.

In this way, when the execution request of the cell reselection and the group notification are performed using the same paging message, the UE 100 can suppress PRACH contention by starting the random access procedure after the cell reselection. Thus, MBS reception can be smoothly performed.

Figure 16:
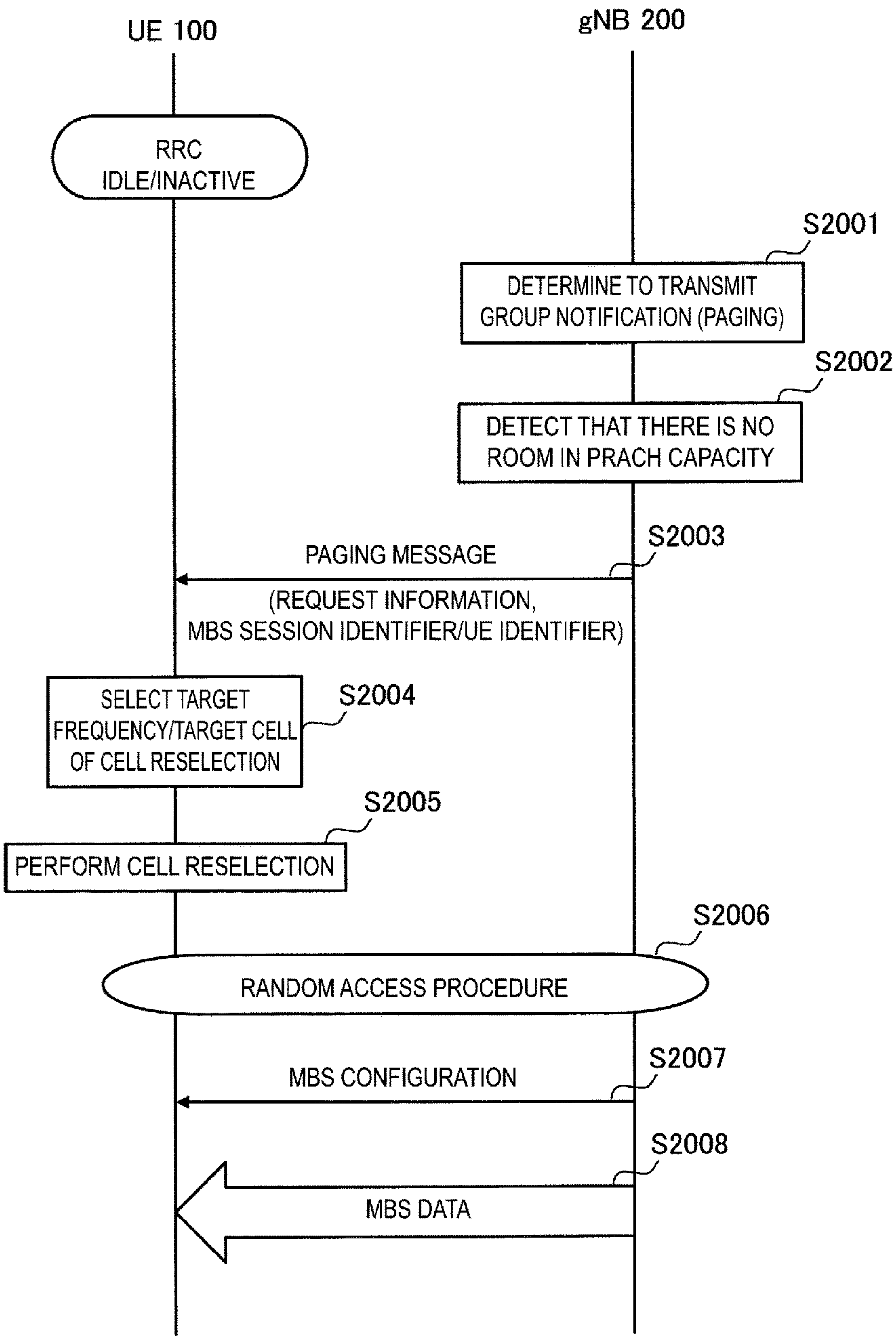
FIG. 16 is a diagram illustrating a specific example of an operation of the second embodiment.

FIG. 16 is a diagram illustrating a specific example of an operation of the second embodiment.

In Step S2001, the gNB 200 determines to transmit a group notification (paging) for notifying start of an MBS session, for example, upon receipt of a PAGING message from the AMF 300A.

In Step S2002, the gNB 200 detects that there is no room in the PRACH capacity of the cell of the gNB 200. For example, the gNB 200 detects, from UE context information that the gNB 200 has, that the number of UEs 100 waiting for start of the MBS session in the RRC idle state or the RRC inactive state exceeds a certain threshold value (for example, configured by an OAM). The gNB 200 then determines to perform PRACH distribution (MCLD).

In Step S2003, the gNB 200 transmits a paging message by RRC. The paging message includes request information (Redistribution Indication) for instructing one-shot MCLD (cell reselection) and an MBS session identifier or a UE identifier for the group notification. The UE 100 receives the paging message.

In Step S2004, the UE 100 detects that the received paging message includes both information regarding start of the MBS session in which the UE 100 is interested (calling) and the instruction of the one-shot MCLD (cell reselection). The UE 100 first selects a cell (target) in accordance with the MCLD configuration.

In Step S2005, the UE 100 performs cell reselection.

In Step S2006, the UE 100 transitions to the RRC connected state by performing a random access procedure in the reselected cell. For example, the UE 100 performs transmission of a PRACH (Msg1), reception of a random access response (Msg2), transmission of an RRC Setup Request message or RRC Resume Request message (Msg3), and reception of a Contention resolution (Msg4) in this order.

In Step S2007, the gNB 200 transmits an RRC Reconfiguration message for performing MRB configuration to the UE 100. Alternatively, the gNB 200 may cause the UE 100 to hand over to an appropriate cell (MBS providing cell).

In Step S2008, the UE 100 receives MBS data.

Other Embodiments

In the above-described embodiments and examples, an example has been described in which the first NW apparatus changes the content of the paging message (group notification) to be transmitted to the second NW apparatus in accordance with whether the second NW apparatus supports the MBS function. However, the above-described embodiments and examples are not limited thereto. The first NW apparatus may change the content of the UE context to be transmitted to the second NW apparatus in accordance with whether the second NW apparatus supports the MBS function. For example, when the gNB 200 supports the MBS function, the AMF 300A may transmit, to the gNB 200, information indicating whether the UE is participating in the MBS session as the UE context. Alternatively, when the neighboring gNB 200B supports the MBS function, the gNB 200A may transmit, to the neighboring gNB 200B, the interest information regarding the MBS session of the UE in UE context transfer during handover.

The first NW apparatus may determine establishment of the MBS session and handover in accordance with the detailed MBS capability information of the second NW apparatus. For example, the AMF 300A may determine whether to establish a multicast session with the gNB 200 (whether to transmit a multicast session establishment request) and/or whether to establish a broadcast session (whether to transmit a broadcast session establishment request). Alternatively, the gNB 200A may determine whether it is possible to perform handover of the UE receiving the MBS session to the neighboring gNB 200B.

Each operation flowchart described above is not necessarily performed separately and independently, but two or more operation flowcharts can be combined and performed. For example, some steps of one operation flowchart may be added to another operation flowchart, or some steps of one operation flowchart may be replaced with some steps of another operation flowchart.

In the embodiment and examples described above, an example in which the base station is an NR base station (gNB) has been described; however, the base station may be an LTE base station (eNB) or a 6G base station. The base station may be a relay node such as an Integrated Access and Backhaul (IAB) node. The base station may be a DU of an IAB node. The user equipment may be a mobile termination (MT) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing the processes to be performed by the UE 100 or the gNB 200 may be integrated, and at least part of the UE 100 or the gNB 200 may be configured as a semiconductor integrated circuit (a chipset or an SoC).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Further, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Embodiments have been described above in detail with reference to the drawings, but specific configurations are not limited to those described above, and various design variations can be made without departing from the gist of the present disclosure.

Supplementary Note

Introduction

In RAN #88, revised work items have been approved that are related to NR multicast broadcast service (MBS). Group notification has been discussed in RAN2 #113bis-e and the following agreement has been reached.

Support Group Notification for Multicast for MBS Supporting Node

For Delivery mode 1, a UE is not expected to monitor an RRC-connected group notification channel.

Whether the RAN2 needs to handle a problem of PRACH capacity caused by the group notification needs to be further studied.

The same group notification ID is used in both of an RRC idle state and an RRC inactive state.

Reply LS

For a non-supporting node, use of an MBS session ID affects a non-MBS node and thus does not work. Unicast paging works.

The MBS session ID can be used to support the node.

Short Post Mail Discussion for LS Reply.

In RAN2 #114-e, a paging message is used for the group notification.

A PCCH is used for multicast activation notification (also used for an MBS supporting node).

It is confirmed that the MBS session ID is conveyed by the notification.

Use of paging in all (legacy) POs using PRNTIs is a baseline assumption (other variants can still be discussed).

In this supplementary note, the details of the group notification and the problem of the PRACH capacity will be described.

Discussion

Group Notification in Delivery Mode 1

Confirmation of Baseline Assumption

The RAN2 has agreed that "a PCCH is used for multicast activation notification (also used for an MBS supporting node)" and "use of paging in all (legacy) POs using PRNTIs is a baseline assumption (other variants can still be discussed)". These can be interpreted to mean that the legacy paging needs to be enhanced for the group notification. Thereby, the enhancement is intended to achieve a concept same as, and/or similar to, the concept of ETWS/CMAS notification in LTE. These agreements are beneficial for power consumption from the viewpoint of the UE and have little impact on paging resource load from the viewpoint of the NW.

Opinion 1: In Observation 1, the baseline assumption made by the RAN2 is beneficial for power consumption of the UE and has only little impact on paging resource load.

In RAN2 #114-e, some companies who support a separate P-RNTI, separate PO, and/or separate paging message express concern particularly about potential impact increasing UE power consumption of a legacy UE. It seems necessary to analyze the impact of the RAN2 baseline (i.e., Opinion 1) on the legacy UE in comparison with an MBS service (i.e., PDU session) provided by unicast. This is because this method is merely a method up to Rel-16. In unicast, all UEs interested in an MBS service need to be paged by a legacy mechanism, i.e., one-by-one paging. These unicast paging messages are received by the legacy UEs, and additional power is consumed in proportion to the number of unicast paging transmissions of the UEs interested in the MBS service. Thus, even when the group notification is transmitted in all legacy POs in one paging DRX cycle using legacy P-RNTIs, an impact on the legacy UEs is substantially the same, and on the contrary, when many UEs are interested in the MBS service, the group notification is expected to be beneficial for power saving.

Opinion 2: Power consumption of the legacy UE is not problematic in the group notification.

It is pointed out that it is better to transmit the group notification only in the PO for the UE interested in the MBS service. It may be beneficial to reduce signal overhead when no UE misses the group notification, but it is assumed that such optimization can be handled by NW implementation.

Opinion 3: Optimization of use of the legacy PO depends on introduction of the NW.

Thus, the RAN2 needs to make sure that, at least from the viewpoint of the UE, the legacy P-RNTI and the legacy PO are reused and that the legacy paging message is enhanced for the group notification. The UE is only required to monitor the paging in the PO of the UE. That is, it means that this feature is the same as the legacy paging.

Proposal 1: The RAN2 is recommended to confirm the group notification using the legacy paging messages transmitted in all the legacy POs having the legacy P-RNTIs at least from the viewpoint of the UE.

Enhancement of Existing Paging Message

When Proposal 1 is agreed upon, it is necessary to discuss a method of integrating the group notification into the existing paging message. The current paging message includes a PagingRecordList, which is a list of paged UE-IDs, i.e., 5G-S-TMSIs or I-RNTIs. The following two options are conceivable for the group notification by the paging.

Option A: The MBS session ID is described in the existing PagingRecord list (an example is illustrated in FIG. 15).

Option B: The MBS session ID is indicated in a new list (an example is illustrated in FIG. 16).

Option A may be technically feasible as in the above example, but since the UE-ID cannot be deleted from the PagingRecord unless non-backward compatibility can be ignored, the UE-ID for unicast and the MBS session ID need to coexist in the same Record. It can be considered to add the MBS session ID to the PagingUE-ID. However, the MBS session ID is not the UE-ID and thus has a concept different from the 5G-S-TMSI and the I-RNTI, which thus seems to be slightly unnatural.

Option B can be implemented as in the above example and is simple. There is no contradiction with the concept of the existing IE. Because the enhanced concept of ETWS/CMAS notification in LTE is reused, there can be no impact on the legacy UE.

Thus, the RAN2 needs to agree to define a new list in the paging message, that is, Option B.

Proposal 2: The RAN2 is recommended to agree to define a new list for the group notification in the existing paging message.

Problem of PRACH Capacity

Definition of Problem

Whether to handle the problem of the PRACH capacity needs to be further studied. Due to the group notification, many UEs are simultaneously paged and many PRACH collisions occur. Furthermore, the four WIs (RedCap, SDT, Coverage Enhancements, and RAN Slicing) of Rel-17 currently considers using PRACH partitioning to indicate original Message 1, which however may affect the overall PRACH capacity. Thus, in the Rel-17 network, regardless of the multicast service or the unicast service, the access latency may be increased due to an increase in PRACH collision.

Typically, the PRACH capacity is handled by appropriate NW implementation. For example, the gNB can prepare more resources before starting the multicast session. However, this may not apply in the case of Rel-17 according to some observations, in addition to the nature of the group notification and many Msg1 indications. On the other hand, it is pointed out that in NW implementation, the UE can be kept in the RRC connected state until the multicast session is started/activated or until the session is deactivated in order to avoid PRACH collision. Needless to say, since the UE in the RRC connected state transmits much more signals than the UE in the idle/inactive state, this is not preferable from the viewpoint of both power consumption of the UE and the resource efficiency of the NW. Thus, it takes large cost in this option only to avoid PRACH collision.

Opinion 4: The option of the NW implementation for keeping the UE in the RRC connected state only to avoid PRACH transmission from the UE is not preferable from the viewpoint of both power consumption of the UE and spectral efficiency.

In the group notification of Delivery mode 1, the capacity of the PRACH is considered to be certainly problematic. Thus, the RAN2 needs to discuss a method of solving this problem.

Proposal 3: the RAN2 is recommended to discuss a method of solving the problem of the PRACH capacity caused by the group notification, i.e., NW implementation or a standard mechanism of distributing PRACH transmissions.

Approach to Assumed Solution

When the introduction of the standard mechanism of distributing PRACH transmissions from a plurality of UEs is proposed in Proposal 3, the following two approaches are conceivable.

Approach A: Frequency Domain Spreading

This method aims to distribute PRACH transmissions over a plurality of frequencies. In the same or a similar problem, Multicarrier Load Distribution (MCLD) actually discussed in Rel-13 LTE enables redistribution of idle UEs to a plurality of frequencies. Thus, there may be an option for the gNB to perform redistribution immediately before transmitting the group notification. A drawback of this approach is that when no other frequency provides an intended MBS service through PTM, the UE either provides the MBS service by unicast or performs handover to a frequency providing the PTM.

Approach B: Time Domain Spreading

This method aims to distribute PRACH transmissions over a plurality of timings. A certain transmission occasion in which a PRACH is allowed in a set of UEs and is not allowed in another set of UEs is considered to be needed. A drawback of this method is that since a new mechanism is required, more standard approaches such as a method of grouping UEs and a method of specifying a PRACH transmission occasion are required and that since some UEs need to wait for PRACH transmission for a certain period of time after receiving the group notification, access delay occurs.

These approaches have advantages and disadvantages as briefly described above. Thus, the RAN2 needs to discuss which approach is desirable, if necessary, in light of the actual deployment scenario of the NR MBS.

Proposal 4: According to the conclusions of Proposal 4 and Proposal 3, the RAN2 needs to further discuss whether to enhance PRACH transmissions from a plurality of UEs in a frequency domain and/or a time domain.

REFERENCE SIGNS

1: Mobile communication system
100: UE
110: Receiver
120: Transmitter
130: Controller
200: gNB
201: CU
202: DU
210: Transmitter
220: Receiver
230: Controller
240: Backhaul communicator
300A: AMF
310: Communicator
320: Controller

The invention claimed is:

1. A communication method, comprising:

transmitting, by a first base station to a second base station via an Xn interface, a message including MBS capability information indicating a support status of a multicast broadcast service MBS) function of the first base station, the first base station and the second base station being distinct base stations connected via the Xn interface;

after transmitting the MBS capability information, receiving, by the first base station from the second base station via the Xn interface, a MBS paging message including a Temporary Mobile Group Identity (TMGI); and in response to receiving the MBS paging message, transmitting, by the first base station, a paging message including the TMGI to a user equipment in a Radio Resource Control (RRC) inactive state.

2. The communication method according to claim 1, wherein the MBS paging message is used for MBS multicast transmission and is different from a Radio Access Network (RAN) paging message used for unicast transmission.

3. The communication method according to claim 1, further comprising:

receiving, by the first base station from the user equipment in the RRC inactive state, an RRC message for starting a procedure for transitioning to an RRC connected state.

4. The communication method according to claim 1, wherein the MBS capability information is associated with each cell managed by the first base station.

5. A first base station comprising:

a transmitter configured to transmit, to a second base station via an Xn interface, a message including MBS capability information indicating a support status of a multicast broadcast service (MBS) function of the first base station, the first base station and the second base station being distinct base stations connected via the Xn interface;

a receiver configured to, after transmitting the MBS capability information, receive from the second base station via the Xn interface, a (MBS) paging message including a Temporary Mobile Group Identity (TMGI); and the transmitter configured to, in response to receiving the MBS paging message, transmit a paging message including the TMGI to a user equipment in a Radio Resource Control (RRC) inactive state.

6. The first base station according to claim 5, wherein the MBS capability information is associated with each cell managed by the first base station.

7. A mobile communication system comprising a first base station and a second base station, the first base station and the second base station being distinct base stations connected via an Xn interface, wherein the second base station is configured to receive, from the first base station via the Xn interface, a message including MBS capability information indicating a support status of a multicast broadcast service (MBS) function of the first base station, the first base station is configured to, after transmitting the MBS capability information to the second base station, receive from the second base station via the Xn interface, a MBS paging message including a Temporary Mobile Group Identity (TMGI), and the first base station is configured to, in response to receiving the MBS paging message, transmit a paging message including the TMGI to a user equipment in a Radio resource Control (RRC) inactive state.

8. The mobile communication system according to claim 7, wherein the MBS capability information is associated with each cell managed by the first base station.

* * * * *